(12) United States Patent
Kues et al.

(10) Patent No.: US 12,269,202 B2
(45) Date of Patent: *Apr. 8, 2025

(54) METHOD FOR TRANSFERRING AN EMBOSSED STRUCTURE TO THE SURFACE OF A COATING

(71) Applicant: BASF Coatings GmbH, Münster (DE)

(72) Inventors: Jan-Bernd Kues, Muenster (DE); Susanne Piontek, Muenster (DE); Joerg Exner, Muenster (DE); Joerg Lenz, Muenster (DE); Birgit Kleine-Bley, Muenster (DE); Wilfried Schipper, Dortmund (DE); Robert von der AA, Borsdorf/OT Panitsch (DE); Frank Bergmann, Halle (DE); Michael Lorenz, Halle (DE); Sven Olle Krabbenborg, Leipzig (DE); Joerg Duennewald, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 931 days.

This patent is subject to a terminal disclaimer.

(21) Appl. No.: 17/041,487

(22) PCT Filed: Mar. 28, 2019

(86) PCT No.: PCT/EP2019/057923
§ 371 (c)(1),
(2) Date: Sep. 25, 2020

(87) PCT Pub. No.: WO2019/185833
PCT Pub. Date: Oct. 3, 2019

(65) Prior Publication Data
US 2021/0129415 A1    May 6, 2021

(30) Foreign Application Priority Data

Mar. 28, 2018    (EP) .................................... 18164689

(51) Int. Cl.
*B29C 59/04* (2006.01)
*B29C 59/02* (2006.01)
(Continued)

(52) U.S. Cl.
CPC .......... *B29C 59/046* (2013.01); *B29C 59/022* (2013.01); *B44B 5/026* (2013.01);
(Continued)

(58) Field of Classification Search
None
See application file for complete search history.

(56) References Cited

U.S. PATENT DOCUMENTS 9,718,910 B2    8/2017   Otani et al.
9,999,994 B2 *  6/2018   Jigami ................ C08F 283/065
(Continued)

FOREIGN PATENT DOCUMENTS

EP    2146805 B1    11/2011
EP    3173449 A1    5/2017
(Continued)

OTHER PUBLICATIONS

Machine translation of JP 2001-105435 A, Apr. 2001 (Year: 2001).*
(Continued)

*Primary Examiner* — Benjamin A Schiffman
(74) *Attorney, Agent, or Firm* — Armstrong Teasdale LLP

(57) ABSTRACT

The present disclosure relates to a method for transferring an embossed structure to at least a part of a surface of a coating (B2), using a composite (F1B1) composed of a substrate (F1) and of an at least partially embossed and at least partially cured coating (B1), where the coating (B2) and the coating (B1) of the composite (F1B1) have embossed structures which are mirror images of one another. Also described herein is a composite (B2B1F1). Further described herein is a use of this composite for producing an at least partially (Continued)

embossed coating (B2) in the form of a free film or a composite (B2KF2) composed of a substrate (F2), at least one adhesive (K), and the coating (B2).

11 Claims, 1 Drawing Sheet

(51) Int. Cl.
  *B44B 5/02*  (2006.01)
  *B44C 1/24*  (2006.01)
  *C09D 4/06*  (2006.01)
  *C09D 133/08*  (2006.01)
  *C09D 133/12*  (2006.01)
  *C09J 7/29*  (2018.01)
  *B29K 667/00*  (2006.01)
  *B29L 7/00*  (2006.01)
  *B29L 31/00*  (2006.01)

(52) U.S. Cl.
  CPC ............... *B44C 1/24* (2013.01); *C09D 4/06* (2013.01); *C09D 133/08* (2013.01); *C09D 133/12* (2013.01); *C09J 7/29* (2018.01); *B29C 2059/023* (2013.01); *B29K 2667/003* (2013.01); *B29L 2007/001* (2013.01); *B29L 2031/7562* (2013.01); *C09J 2301/122* (2020.08)

(56) References Cited

U.S. PATENT DOCUMENTS

| | | |
|---|---|---|
| 10,308,768 B2 | 6/2019 | Nees et al. |
| 2007/0204953 A1 | 9/2007 | Lin |
| 2015/0166704 A1 | 6/2015 | Otani et al. |
| 2016/0082688 A1 | 3/2016 | Nakai et al. |
| 2021/0023873 A1* | 1/2021 | Kues ................. B29C 43/46 |
| 2022/0373881 A1* | 11/2022 | Krabbenborg ........ G03F 7/0002 |

FOREIGN PATENT DOCUMENTS

| | | | |
|---|---|---|---|
| JP | 2001105435 A | * | 4/2001 |
| JP | 2018505288 A | | 2/2018 |
| TW | 201509962 A | | 3/2015 |

OTHER PUBLICATIONS

Leitgeb, Markus, et al. "Multilength scale patterning of functional layers by roll-to-roll ultraviolet-light-assisted nanoimprint lithography: Supporting Information." ACS nano 10.5 (Mar. 29, 2016): pp. 1-11. (Year: 2016).*

Leitgeb et al., "Multilength Scale Patterning of Functional Layers by Roll-to-Roll Ultraviolet-Light-Assisted Nanoimprint Lithography", ACS Nano, 2016, pp. 4926-4941, 10.

International Search Report for corresponding PCT/EP2019/057378 mailed May 29, 2019, 2 pages.

* cited by examiner

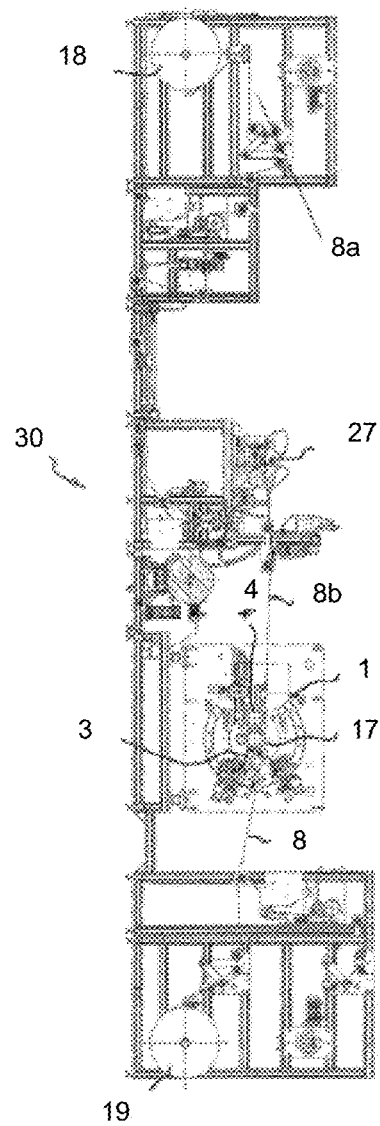

METHOD FOR TRANSFERRING AN EMBOSSED STRUCTURE TO THE SURFACE OF A COATING

CROSS-REFERENCE TO RELATED APPLICATIONS

This application is a U.S. National Phase Application of International Patent Application No. PCT/EP2019/057923, filed on Mar. 28, 2019, which claims the benefit of priority to European Patent Application Number 18164689.4, filed Mar. 28, 2018, the entire contents of which are hereby incorporated by reference herein.

BACKGROUND OF THE INVENTION

The present invention relates to a method for transferring an embossed structure to at least a part of a surface of a coating (B2), using a composite (F1B1) composed of a substrate (F1) and of an at least partially embossed and at least partially cured coating (B1), where the coating (B2) and the coating (B1) of the composite (F1B1) have embossed structures which are mirror images of one another, where the method comprises at least the steps (1) and (2) and also optionally (3), to a composite (B2B1F1), and also to a use of this composite for producing an at least partially embossed coating (B2) in the form of a free film or a composite (B2KF2) composed of a substrate (F2), at least one adhesive (K), and the coating (B2).

In many applications within industry it is nowadays customary to provide workpieces on their surface with structures whose structural features are in the micrometer range or even in the nanometer range. Such structures are also referred to as microstructures
(structures with features in the micrometer range) or nanostructures (structures with features in the nanometer range). Such structures are used, for example, to influence optical, bionic and/or tactile qualities of materials surfaces. Structures of this kind are also referred to as embossments or embossed structures.

One common method here is to transfer these structures into a coating material. Transfer of the structures into the coating material is frequently achieved here with an embossing operation, wherein a die containing, on an embossing surface or transfer surface, the microstructures and/or nanostructures to be formed, in a negative form, is brought into contact with and impressed into the coating material. In order then for the structures to be permanently formed and maintained on the surface of the workpiece, the coating material is typically cured in situ.

The disadvantage with these methods known from the prior art, however, is that continuous methods with high modeling accuracy in a broad size range, such as roll-to-roll or roll-to-plate processes, are suitable only for embossing foils and films (metals, plastic, paper) or plates (metal, plastic, glass). As soon as
the surface is not entirely planar or the components are too large for the embossing machine to be employed, the known methods cannot be used to structure the component surface. In-mold methods known from the prior art for solving this problem, in which the respective component material, such as liquid plastics pellets, for example, is admitted to a structured mold and cured and where, after curing, the component surface carries the positive of the die of the mold surface, are disadvantageous, however, since these methods are discontinuous processes, involve restrictions on the die with the negative structure, require release agents for removing the component from the mold, and feature very low modeling accuracy, particularly in the case of periodic structures with aspect ratios >0.5.

Because the direct embossing methods as described above cannot be utilized for large components such as aircraft wings, wind turbine vanes, or architectural facing elements, for example, an attempt is frequently made here to laminate or bond adhesively the component to a film which on its surface has a nanometer or micrometer structure. The lamination of films, however, is accompanied by numerous disadvantages, since films tend rapidly to yellow, thereby greatly detracting from the visual appearance of the surface; the weight of the component is increased by the use of a film as carrier material, this being a disadvantage particularly in lightweight construction; and films represent a greater barrier to atmospheric oxygen and liquids, for example. The latter fact is a hindrance particularly in repair operations where particular liquids are used in order to clean old coating materials from the component. A greater barrier to atmospheric oxygen may give rise to development of mold particularly in the case of architectural facing elements.

EP 1 304 235 A1 describes a method for generating a structured coating layer by means of a carrier film, and produces a laminar composite consisting of a structured carrier film having release properties and of a coating layer. DE 10 2005 017 170 A1 describes a transfer film which comprises a carrier film and a structure layer disposed thereon. After the structure layer has been cured, it may be bonded adhesively to the target surface to be provided with a structure. US 2007/0218255 A1 describes a method for producing a structured film which can be used for decorating glass.

US 2010/0279075 A1 describes a method for generating a microstructured surface on a component by using a structured carrier film. A disadvantage of the method, however, is that the microstructured film is first covered with a release layer before the application of the structure layer. This necessitates an additional step of work and also has a sharply negative impact on the quality of modeling. An exact, complementary transfer of the microstructure is not possible, since the distance between the individual structure elements of the embossing is disadvantageously reduced by the release layer.

WO 2015/154866 A1 relates to a method for producing a substrate with a structured surface. In that case, first of all, a first UV-curing coating is applied to the substrate and is cured. Atop this cured coating is then applied, as embossing varnish, a second UV-curing coating, which is embossed to generate a microstructure and is subsequently cured.

DE 10 2007 062 123 A1 describes a method for applying an embossing varnish such as, for example, a UV-crosslinkable embossing varnish to a carrier film, structuring the embossing varnish in the micrometer range, and curing the embossing varnish applied to the film to give an embossed film whose microstructure is subsequently modeled by deposition of a metal on the embossed surface, in other words by metalizing of the film. A disadvantage of such modeling by means of subsequent metalization, however, is a resultant unwanted reduction in the quality of modeling.

Lastly, EP 2 146 805 B1 describes a method for producing a material having a textured surface. The method involves providing a substrate with a curable coating, contacting said coating with a texturing medium for embossing, and then curing the coating embossed in this way and removing it from the texturing medium. The texturing medium comprises a surface layer which contains 20% to 50% of an acrylic oligomer, 15% to 35% of a monofunctional monomer, and 20% to 50% of a polyfunctional monomer. WO 2016/090395 A1 and ACS Nano Journal, 2016, 10, pages 4926 to 4941 describe similar methods, with the explicit teaching in each case that, in order to produce the surface layer of the texturing medium, in each case large parts of triply ethoxylated trimethylolpropane triacrylate (TMP(EO)$_3$TA) ought to be used in order to allow the generation of a comparatively hard die of the texturing medium. According to WO 2016/090395 A1, moreover, the coating composition used for producing the surface layer must necessarily include a structural unit which has at least two thiol groups, such as trimethylolpropane tris(3-mercaptopropionate), for example. The use of such thiols in corresponding coating material compositions is often disadvantageous, however, since such compositions do not always have sufficient stability on storage and since coatings produced from them lack adequate weathering stability. A further factor is an odor nuisance, resulting from the use of the thiols, which of course is likewise undesirable.

The embossing methods known from the prior art, such as in particular the methods described in EP 2 146 805 B1, WO 2016/090395 A1, and ACS Nano Journal, 2016, 10, pages 4926 to 4941, are not always sufficiently capable of transferring embossments, particularly in the micrometer range and/or in the nanometer range, i.e., microstructures and/or nanostructures, particularly not without lowering the accuracy of modeling to an unacceptable degree in the case of such a transfer. Moreover, the methods known from the prior art, as observed above, are not always suitable for providing, in particular, large components and/or components having a nonplanar geometry with a nanostructured and/or microstructured coating film which is notable, furthermore, for sufficient weathering stability and whose visual appearance is therefore not adversely affected. At the same time, the embossments are not always adequately replicated.

There is therefore a need for a method for transferring embossed structures that does not have the disadvantages stated above.

A problem addressed by the present invention is therefore that of providing a method for transferring embossed structures to coatings which allows the transfer of embossed structures, such as especially microstructures and/or nanostructures, with sufficient modeling accuracy, and which enables in particular the generation of a very largely reusable embossing die for transferring the embossed structures, and/or can be carried out using an embossing die of this kind. It is a further object of the present invention to provide a method which enables even, in particular, large components and/or components having a nonplanar geometry to be provided with a coating comprising an embossed structure of this kind, said coating being further distinguished, moreover, by sufficient weathering stability and no adverse effect, therefore, on its optical, bionic and/or tactile appearance. At the same time, it is to be possible in each case for the embossed structures that are to be transferred to be replicated to an extremely high degree, without the method featuring in particular any disadvantages brought about by unwanted or inadequate properties on the part of the coatings and coating compositions used, such as inadequate adhesion, for example.

This problem is solved by the subject matter claimed in the claims of the patent, and also by the preferred embodiments of that subject matter that are described in the description hereinafter.

SUMMARY OF THE INVENTION

A first subject of the present invention is therefore a method for transferring an embossed structure to at least a part of a surface of a coating (B2), using a composite (F1B1) composed of a substrate (F1) and of an at least partially embossed and at least partially cure coating (B1), where the coating (B2) and the coating (B1) of the composite (F1B1) have embossed structures which are mirror images of one another, and where the method comprises at least the steps (1) and (2) and also optionally (3), specifically (1) applying a coating composition (B2a) to at least a part of an at least partially embossed surface of a composite (B1F1) composed of a substrate (F1) and of an at least partially embossed and at least partially cured coating (B1), to give a composite (B2aB1F1), and (2) at least partially curing the applied coating composition (B2a) to give a composite (B2B1F1) composed of substrate (F1), of at least partially embossed and at least partially cured coating (B1), and of at least partially cured coating (B2), and (3) optionally removing the coating (B2) from the composite (B2B1F1) to restore the composite (B1F1) used in step (1), where the coating (B2), on its surface previously facing the coating (B1) within the composite (B2B1F1), has the mirror image of the at least partially embossed surface of the coating (B1) of the composite (B1F1) used in step (1) and restored in that step, where the coating composition (B1a) used for producing the coating (B1) of the composite (B1F1) used in step (1) and restored in step (3) is a radiation-curable coating composition, wherein the coating composition (B1a) comprises at least one component (a) in an amount in a range from 40 to 95 wt %, at least one additive as component (b) in an amount in a range from 0.01 to 5 wt %, at least one photoinitiator as component (c) in an amount in a range from 0.01 to 15 wt %, and at least one component (d), comprising at least one carbon double bond, in an amount in a range from 0 to 45 wt %, where (i) the components (a), (b), (c), and (d) are each different from one another, (ii) the stated amounts of the components (a), (b), (c), and (d) are each based on the total weight of the coating composition (B1a), and (iii) the amounts of all components present in the coating composition (B1a) add up to 100 wt %, and where component (a) comprises at least three structural units, each different from one another or at least partially identical, of the formula (I)

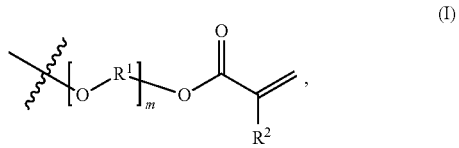

in which the radicals R$^1$ in each case independently of one another are a C$_2$-C$_8$ alkylene group, the radicals R$^2$ in each case independently of one another are H or methyl, and the parameters m each independently of one another are an integral parameter in a range from 1 to 15, but with the proviso that the parameter m is at least 2 in at least one of the structural units of the formula (I) within the component (a).

With preference, the parameter m in the at least three structural units of the formula (I), which are each different from one another or are at least partially identical, in component (a) of the coating composition (B1a) is in each case at least 2.

It has surprisingly been found that the method of the invention enables the transfer of embossed structures, more particularly microstructures and/or nanostructures, to the coating (B2) in a very high modeling accuracy, so that there is no loss of depth of modulation during embossing, with modeling taking place more particularly in a high accuracy in a range from 10 nm to 1000 µm structure width and in a range from 0.1 nm to 1000 µm structure depth. In this context it has in particular been surprisingly found that the method of the invention enables the transfer of embossed structures with a very high modeling accuracy and a high level of replication success with a composite (F1B1) which is obtainable by coating of a radiation-curable coating composition (B1a) onto a substrate (F1).

It has further been surprisingly found that the method of the invention can be applied so advantageously because the coating (B1) of the composite (F1B1) employed, which is obtainable by coating of a radiation-curable coating composition (B1a) onto a preferably moving substrate (F1), is notable for high double bond conversion. As a result, effective separation is enabled between the coating (B2) and the composite within step (3) of the method of the invention. It has surprisingly been found, moreover, that the method of the invention can be applied so advantageously because the coating (B1) on the substrate (F1) is distinguished by very good adhesion.

It has further been surprisingly found that with the method of the invention it becomes possible to provide, in particular, even large components and/or components having a nonplanar geometry with a coating having such an embossed structure, or to transfer a coating having such an embossed structure onto said components. It has surprisingly been found, furthermore, that the resultant coatings (B2) provided with such an embossed structure are distinguished by sufficient weathering stability and therefore have no adverse effect in terms of their optical, bionic and/or tactile appearance. Moreover, the method of the invention allows the coatings (B2) having such an embossed structure to be applied or bonded directly to such substrates, such as large components and/or components having a nonplanar geometry, without any need for there to be one or more further layers or optionally a coated film present between substrate and coating.

Moreover, it has surprisingly been found that, if the coating composition (B2a) used in step (1) is a radiation-curable coating composition, such as a coating composition curable by UV radiation, then it cures at least partially or completely in step (2), even at rapid process speeds, despite the fact that, in order to produce curing, the UV radiation must penetrate through the composite (F1B1), which may constitute, for example, a PET film (F1) 125 µm thick and a coating (B1) up to 150 µm thick. A further surprise is that the coating (B2) can be separated easily from the composite (F1B1) in step (3) of the method. A particular surprise is that this good release effect is achieved with respect to any conventional radiation-cured coating (B2), by virtue of the specific constitution of the at least partially cured coating (B1).

It has surprisingly been found, moreover, that, if the coating composition (B2a) used in step (1) is a physically drying, thermally curable and/or chemically curable coating composition, then the embossed structure of the coating (B1), on application of (B2a) in step (1), is transferred with good modeling accuracy, despite the fact that in this case the evaporation of the solvent typically present in these cases in (B2a) suggests the likelihood of high contraction, typically resulting in a poorer modeling accuracy. In the present case, however, this has surprisingly not been found. It is also surprising in this case, furthermore, that in the optional step (3) of the method, the coating (B2) can be easily separated from the composite (F1B1). A particular surprise is that this good release effect is achieved with respect to any conventional physically dried, thermally cured and/or chemically cured coating (B2) by virtue of the specific constitution of the at least partially cured coating (B1).

It has surprisingly been found, furthermore, that the composite (F1B1) which can be used within the method of the invention in step (1) to transfer the embossed structures such as microstructures and/or nanostructures is reusable, this being an advantage on economic grounds. Surprisingly, moreover, the composite (F1B1) not only is reusable and hence utilizable a number of times, but can also be produced quickly and inexpensively on the large industrial scale.

A further subject of the present invention is also a composite (B2B1F1) which is composed of a substrate (F1), of an at least partially embossed and at least partially cured coating (B1), and of a coating (B2) applied to (B1) and at least partially cured, where the coating (B1) is producible by at least partially curing a coating composition (B1a), applied to at least a part of a surface of the substrate (F1) and at least partially embossed, by radiation curing, where the coating composition (B1a) is a radiation-curable coating composition, wherein the coating composition (B1a) comprises
at least one component (a) in an amount in a range from 40 to 95 wt %,
at least one additive as component (b) in an amount in a range from 0.01 to 5 wt %,
at least one photoinitiator as component (c) in an amount in a range from 0.01 to 15 wt %, and
at least one component (d), comprising at least one carbon double bond, in an amount in a range from 0 to 45 wt %,
where (i) the components (a), (b), (c), and (d) are each different from one another, (ii) the stated amounts of the components (a), (b), (c), and (d) are each based on the total weight of the coating composition (B1a), and (iii) the amounts of all components present in the coating composition (B1a) add up to 100 wt %,
and where component (a) comprises at least three structural units, each different from one another or at least partially identical, of the formula (I)

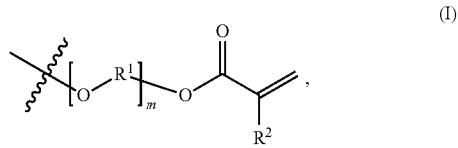

in which
the radicals $R^1$ in each case independently of one another are a $C_2$-$C_8$ alkylene group, the radicals $R^2$ in each case independently of one another are H or methyl, and
the parameters m each independently of one another are an integral parameter in a range from 1 to 15, but with the proviso that the parameter m is at least 2 in at least one of the structural units of the formula (I) within the component (a).

With preference, this composite is obtained by method steps (1) and (2).

A further subject of the present invention, moreover, is a use of the composite (B2B1F1) of the invention for producing a coating (B2), at least partially embossed on one of its surfaces, in the form of a free film, or for producing a composite (B2KF2) composed of a substrate (F2), at least one adhesive (K), and the coating (B2). This composite (B2KF2) is obtained preferably by traversal of the method stages (3a), (3b), and (3c), specifically by (3a) applying an adhesive (K) to at least a part of the surface of the composite (B2B1F1), on its side having the coating (B2), to give a composite (KB2B1F1), (3b) applying a substrate (F2) to the composite (KB2B1F1) obtained after stage (3a), to at least a part of its surface having the adhesive (K), or vice-versa, to give a composite (F2KB2B1F1), and (3c) peeling the composite (B1F1) from the composite (F2KB2B1F1) to give a composite (F2KB2), where the coating (B2) of this composite has on its surface at least partially the mirror image of the at least partially embossed surface of the coating (B1) of the composite (B1F1).

DETAILED DESCRIPTION OF THE INVENTION

The term "comprising" in the sense of the present invention, in connection with the coating compositions used in accordance with the invention, such as, for example, with the coating composition (B1a), and with the method of the invention and its method steps, preferably has the definition of "consisting of". With regard for example to the coating composition (B1a) employed in accordance with the invention—in addition to the components (a) and (b) and also (c) and optionally (d)—it is possible, moreover, for one or more of the other components identified below and optionally present in the coating composition (B1a) employed in accordance with the invention to be included in that composition. All the components may each be present in their preferred embodiments identified below. With regard to the method of the invention, it may have further, optional method steps in addition to steps (1) and (2) and also optionally (3), such as, for example, the steps (3a), (3b), and (3c), and (4) to (7). Inventive Method for Transferring an Embossed Structure, Comprising at Least Steps (1) to (2) and Optionally (3)

A first subject of the present invention is, as observed above, a method for transferring an embossed structure to at least a part of a coating (B2), using a composite (B1F1) composed of a substrate (F1) and of an at least partially embossed and at least partially cured coating (B1), where the coating (B2) and the coating (B1) of the composite (B1F1) have embossed structures which are mirror images of one another, and where the method comprises at least the steps (1) and (2) and also optionally (3).

The method of the invention is preferably a continuous method.

After method steps (1) to (3) have been carried out, on the one hand, the composite (B1F1) used in step (1) is restored, i.e., is recovered and can preferably be reused, i.e., employed again in the method. On the other hand, the coating (B2) is obtained, and, on its surface previously facing the coating (B1) within the composite (F1B1B2), it has the mirror image of the at least partially embossed surface of the coating (B1) of the composite (B1F1) used in step (1) and then restored.

According to optional step (3), (B2) may be obtained as a free film by peeling the composite (B1F1) from the coating (B2) within the composite (B2B1F1), or vice-versa. This restores the composite (B1F1).

The coating (B2) is preferably obtained in step (3) in three stages, through stages (3a), (3b), and (3c), in the form of a composite (B2KF2), specifically by (3a) applying an adhesive (K) to at least a part of the surface of the composite (B2B1F1), on its side having the coating (B2), to give a composite (KB2B1F1), (3b) applying a substrate (F2) to the composite (KB2B1F1) obtained after stage (3a), to at least a part of its surface having the adhesive (K), or vice-versa, to give a composite (F2KB2B1F1), and (3c) peeling the composite (B1F1) from the composite (F2KB2B1F1) to give a composite (F2KB2), where the coating (B2) of this composite has on its surface at least partially the mirror image of the at least partially embossed surface of the coating (B1) of the composite (B1F1).

The coating (B2) can then be obtained in turn as a free film by peeling from the composite (F2KB2) obtained after stage (3c).

Steps (1) to (3) of the method of the invention are therefore carried out in order to produce the coating (B2), optionally present in the form of the composite (F2KB2).

The desired embossed structure is transferred by the application of the preferably radiation-curable coating composition (B2a) to at least a part of an at least partially embossed surface of a composite (B1F1) composed of a substrate (F1) and of an at least partially embossed and at least partially cured coating (B1) in accordance with method step (1), to the coating composition (B2a) or, after implementation of step (2), to the coating (B2).

The term "embossing" refers to the at least partial furnishing of the coating composition (B2a) after step (1) or of the coating (B2) after step (2), on at least a part of its surface, with an embossed structure. In this case at least a certain area of the coating composition (B2a) or of the coating (B2) is furnished with an embossed structure. Preferably, the entire surface of the coating composition (B2a) or of the coating (B2) is furnished with an embossed structure. Similar comments apply in connection with the term "embossing" with regard to the at least partially embossed composite (B1F1) employed as embossing die in step (1) and composed of a substrate (F1) and of an at least partially embossed and at least partially cured coating (B1), which may be produced in accordance with steps (4) to (7) described below.

The embossed structures of the composites (B1F1) and (B2KF2) and of the coating (B2) are based preferably and in each case independently of one another on a repeating and/or regularly arranged pattern. The structure in each case may be a continuous embossed structure such as a continuous groove structure or else a plurality of preferably repeating individual embossed structures. The respective individual embossed structures in this case may in turn be based preferably on a groove structure having more or less strongly pronounced ridges (embossed elevations) defining the embossed height of the embossed structure. In accordance with the respective geometry of the ridges of a preferably repeating individual embossed structure, a plan view may show a multiplicity of preferably repeating individual embossed structures, each of them different, such as, for example, preferably serpentine, sawtooth, hexagonal, diamond-shaped, rhomboidal, parallelogrammatical, honeycomb, circular, punctiform, star-shaped, rope-shaped, reticular, polygonal, preferably triangular, tetragonal, more preferably rectangular and square, pentagonal, hexagonal, heptagonal and octagonal, wire-shaped, ellipsoidal, oval and lattice-shaped patterns, it also being possible for at least two patterns to be superimposed on one another. The ridges of the individual embossed structures may also have a curvature, i.e., a convex and/or concave structure.

The respective embossed structure may be described by its width such as the width of the ridges, in other words by its structure width, and by the height of the embossments, in other words by its structure height (or structure depth). The structure width such as the width of the ridges may have a length of up to one centimeter, but is preferably situated in a range from 10 nm to 1 mm. The structure height is situated preferably in a range from 0.1 nm to 1 mm. Preferably, however, the respective embossed structure represents a microstructure and/or nanostructure. Microstructures here are structures—in terms both of structure width and of structure height—having characteristics in the micrometer range. Nanostructures here are structures—in terms both of structure width and of structure height—having characteristics in the nanometer range. Microstructures and nanostructures here are structures which have a structure width in the nanometer range and a structure height in the micrometer range or vice-versa. The terms "structure height" and "structure depth" are interchangeable here.

The structure width of the respective embossed structure is preferably situated in a range from 10 nm to 500 µm, more preferably in a range from 25 nm to 400 µm, very preferably in a range from 50 nm to 250 µm, more particularly in a range from 100 nm to 100 µm. The structure height of the respective embossed structure is situated preferably in a range from 10 nm to 500 µm, more preferably in a range from 25 nm to 400 µm, very preferably in a range from 50 nm to 300 µm, more particularly in a range from 100 nm to 200 µm. This is so for the embossed structure of the composite (F1B1) and of the composite (B2KF2) and of the coating (B2).

The structure width and structure height of the respective embossed structure are determined here by mechanical scanning of the surface. In this case the embossed height is measured at no less than 10 points on a line, distributed uniformly over the web width of the sample, taking care to ensure that the scanning instrument does not compress the embossed structure. The determination of the structure height represents a determination of the accuracy of modeling and is accomplished by means of scanning force microscopy in accordance with the method described below.

Step (1)

Step (1) of the method of the invention provides for application of a coating composition (B2a) to at least a part of an at least partially embossed surface of a composite (B1F1) composed of a substrate (F1) and of an at least partially embossed and at least partially cured coating (B1), to give a composite (B2aB1F1).

The at least partially embossed and at least partially cured coating (B1) of the composite (F1B1) used in step (1) preferably has embossments in the micrometer and/or nanometer range.

The substrate (F1) at least partially coated with (B1) represents a carrier material for the coating composition (B2a) or the coating (B2) to be applied thereto.

The substrate (F1) or, if a coated substrate is used, the layer located on the surface of the substrate (F1) consists preferably of at least one thermoplastic polymer, selected more particularly from the group consisting of polymethyl (meth)acrylates, polybutyl (meth)acrylates, polyethylene terephthalates, polybutylene terephthalates, polyvinylidene fluorides, polyvinyl chlorides, polyesters, including polycarbonates and polyvinyl acetate, preferably polyesters such as PBT and PET, polyamides, polyolefins such as polyethylene, polypropylene, polystyrene, and also polybutadiene, polyacrylonitrile, polyacetal, polyacrylonitrile-ethylene-propylene-diene-styrene copolymers (A-EPDM), polyetherimides, phenolic resins, urea resins, melamine resins, alkyd resins, epoxy resins, polyurethanes, including TPU, polyetherketones, polyphenylene sulfides, polyethers, polyvinyl alcohols, and mixtures thereof. Particularly preferred substrates or layers on the surface thereof are polyolefins such as, for example, PP (polypropylene), which may alternatively be isotactic, syndiotactic or atactic and may alternatively be unoriented or oriented through mono- or biaxial drawing, SAN (styrene-acrylonitrile copolymers), PC (polycarbonates), PMMA (polymethyl methacrylates), PBT (poly(butylene terephthalate)s), PA (polyamides), ASA (acrylonitrile-styrene-acrylic ester copolymers) and ABS (acrylonitrile-butadiene-styrene copolymers), and also their physical mixtures (blends). Particularly preferred are PP, SAN, ABS, ASA and also blends of ABS or ASA with PA or PBT or PC. Especially preferred are PET, PBT, PP, PE, and polymethyl methacrylate (PMMA) or impact-modified PMMA. Especially preferred is a polyester, most preferably PET, for use as material for the substrate (F1). Alternatively the substrate (F1) itself—optionally in spite of a layer of at least one of the aforementioned polymers applied thereto—may be made of a different material such as glass, ceramic, metal, paper and/or fabric. In that case the substrate (F1) is preferably a plate and may be used, for example, in a roll-to-plate embossing apparatus.

The thickness of the substrate (F1) is preferably 2 µm up to 5 mm. Particularly preferred is a layer thickness of 25 to 1000 µm, more particularly 50 to 300 µm.

The substrate (F1) is preferably a film, more preferably a film web, very preferably a continuous film web. In that case the substrate (F1) may be used preferably in a roll-to-roll embossing apparatus. The thickness of the coating (B1) is preferably 0.1 to 500 µm, more preferably 1 to 300 µm.

In the sense of the present invention, the term "continuous film" or "continuous film web" refers preferably to a film having a length of 100 m to 10 km.

When step (1) is being carried out (and preferably also when steps (2) and (3) of the method are being carried out), the composite (F1B1) used is preferably moved and is therefore a moving composite. During the implementation of step (1), the composite (F1B1) is preferably moved by means of a transport device such as a conveyor belt. The corresponding apparatus used for implementing step (1) therefore preferably comprises such a transport device. The corresponding apparatus used for implementing step (1) further comprises a means for applying the preferably radiation-curable coating composition (B2a) to at least a part of a surface of the composite (F1B1).

By step (1), the desired (mirror-image) embossed structure to be transferred from the composite (F1B1) is transferred to the coating composition (B2a) and, after implementation of step (2), to the coating (B2), by the application of the preferably radiation-curable coating composition (B2a) to at least a part of an at least partially embossed surface of a composite (F1B1) composed of a substrate (F1)

and of an at least partially embossed and at least partially cured coating (B1). The composite (F1B1) therefore functions not only as carrier material for (B2a) or (B2), but also, furthermore, as an embossing die.

The composite (F1B1) used as embossing die in step (1) is preferably reusable and can be employed repeatedly for transferring at least one embossed structure, preferably within the method of the invention. Step (1) preferably transfers microstructures and/or nanostructures as the embossed structure onto the coating composition (B2a) and, after implementation of step (2), onto the coating (B2).

The composite (F1B1) preferably comprises a film web (F1) which has an at least partially embossed and completely cured coating (B1). With particular preference, the substrate (F1) is a continuous film web which has the at least partially embossed and at least partially cured coating (B1), thus making the composite (F1B1) a continuous embossing die.

The composite (F1B1) used as embossing die has a "negative structure" ("negative form"), i.e., the mirror image of the embossed structure which in step (1) of the method of the invention is transferred onto the coating composition (B2a) and, after implementation of step (2), onto the coating (B2).

The corresponding apparatus used for implementing step (1) comprises a means for applying a preferably radiation-curable coating composition (B2a) to at least a part of an at least partially embossed surface of a composite (F1B1) composed of a substrate (F1) and of an at least partially embossed and at least partially cured coating (B1). Additionally, the apparatus used preferably has a means such as a roll or a grid roll mechanism comprising at least one roll for applying pressure or pressing the thus-applied coating composition (B2a) onto the substrate (F1), used preferably in the form of a continuous film web and at least partially coated with (B1), in other words onto the corresponding composite (F1B1), after the application of the radiation-curable coating composition (B2a), this means being positioned preferably downstream—as viewed in the direction of conveying of the composite (F1B1)—of the means for applying the radiation-curable coating composition (B2a).

A suitable means for pressing or applying pressure is, as stated above, a roll or a grid roll mechanism comprising at least one roll. The grid roll mechanism here preferably comprises a metallic roll, as for example a steel roll or a nickel roll, or else a quartz-based roll or a roll coated with at least one plastic.

The composite (F1B1) used in step (1) and composed of substrate (F1) and at least partially embossed and at least partially cured coating (B1) is also referred to below as "master substrate" or "master film". Where the substrate (F1) is a film, the corresponding master film is referred to as "master film". Where the substrate (F1) is a film web, the corresponding master film is referred to as "master film web". The coating (B1) on the master film is also referred to hereinafter as "at least partially cured master coating" or "master coating layer", and the coating composition (B1a) used for producing the cured master coating is referred to as "master coating". Between (F1) and (B1) in the composite (F1B1) there is preferably no further (coating) layer. It is also possible, however, for there to be at least one adhesion promoter layer present between (F1) and (B1) of the composite (F1B1), this layer in this case being preferably permeable to UV radiation.

The composite used as an embossing die (F1B1) can optionally be pretreated before carrying out step (1) with the coating composition (B2a) used. Such a pretreatment comprises or is preferably a wetting of the embossing die with the coating composition (B2a).

Step (2)

Step (2) of the method of the invention provides for at least partial curing of the applied coating composition (B2a) to give a composite (B2B1F1) composed of substrate (F1), of at least partially embossed and at least partially cured coating (B1), and of at least partially cured coating (B2). The composite (B2B1F1) is also referred to below as "transfer substrate". If (F1) is a film, the composite, correspondingly, is a transfer film.

Preferably throughout the duration of the at least partial curing in step (2), the means used in step (1) for applying pressure or pressing the applied coating composition (B2a) onto the composite (F1B1) is in contact with the coating composition (B2a) and/or with the coating (B2) which forms.

Steps (1) and (2) are therefore preferably carried out concurrently. In that case the curing in step (2) takes place during the implementation of step (1), preferably in situ, especially if a radiation-curing coating composition is used as coating composition (B2a). Alternatively, and especially if the coating composition (B2a) used is a thermally curing and/or chemically curing coating composition, steps (1) and (2) are carried out temporally after one another.

The corresponding apparatus used for implementing step (2) therefore preferably comprises at least one radiation source for irradiating the coating composition (B2a) with a curative radiation. Since the coating composition (B2a) is preferably a UV-curable coating composition, the curative radiation used is preferably UV radiation. If the coating composition (B2a) is not radiation-curable, it is preferably chemically curable. In that case the curing in step (2) takes place thermally, by use of suitable thermal radiation sources, for example. Also possible, of course, is combined curing, i.e., thermal curing and curing by means of UV radiation.

Examples of suitable radiation sources for the radiative curing include low-pressure, medium-pressure and high-pressure mercury emitters and also fluorescent tubes, pulsed emitters, metal halide emitters (halogen lamps), lasers, LEDs and, moreover, electronic flash installations, enabling radiative curing without a photoinitiator, or excimer emitters. Radiative curing takes place through exposure to high-energy radiation, i.e., UV radiation or daylight, or by bombardment with high-energy electrons. The radiation dose typically sufficient for crosslinking in the case of UV curing is in the range from 80 to 3000 $mJ/cm^2$. It is of course also possible to use two or more radiation sources for the curing—two to four, for example. These sources may also each emit in different wavelength ranges.

The at least partial curing in step (2) is accomplished preferably by irradiation through the composite (F1B1) used as substrate.

Optional Step (3)

The optional step (3) in the method of the invention provides for removal of the coating (B2) from the composite (B2B1F1) to restore the composite (B1F1) used in step (1), with the coating (B2), on its surface previously facing the coating (B1) within the composite (B2B1F1), having the mirror image of the at least partially embossed surface of the coating (B1) of the composite (B1F1) used in step (1) and restored in that step.

The coating (B2) is preferably obtained as a free film by peeling of the composite (B1F1) from the coating (B2) within the composite (B2B1F1) or vice-versa. The composite (B1F1) is restored in the process.

The coating (B2) is preferably obtained in step (3) in three stages, through stages (3a), (3b), and (3c), in the form of a composite (B2KF2), specifically by (3a) applying an adhesive (K) to at least a part of the surface of the composite (B2B1F1), on its side having the coating (B2), to give a composite (KB2B1F1), (3b) applying a substrate (F2) to the composite (KB2B1F1) obtained after stage (3a), to at least a part of its surface having the adhesive (K), or vice-versa, to give a composite (F2KB2B1F1), and (3c) peeling the composite (B1F1) from the composite (F2KB2B1F1) to give a composite (F2KB2), where the coating (B2) of this composite has on its surface at least partially the mirror image of the at least partially embossed surface of the coating (B1) of the composite (B1F1).

The coating (B2) can then be obtained in turn as a free film by peeling from the composite (F2KB2) obtained after stage (3c).

The adhesive (K) used here is preferably at least one laminating adhesive, such as a polyacrylate or a polyacrylate-based adhesive. As substrate (F2) it is possible to use the same materials identified above already in connection with the substrate (F1). All preferred embodiments used in describing the substrate (F1) are therefore valid analogously for the substrate (F2). The substrate (F2) used is preferably a metallic substrate, more particularly a component such as a component having a nonplanar geometry. Said component may be a coated component having at least one coating layer or a multi-layer coating on at least one of its surfaces, preferably on the surface, which is to be applied to the composite (KB2B1F1). As the adhesive (K) an adhesive may be used, which is itself part of a multi-layer construction. Examples of such adhesives (K) are corresponding structures, which have as a middle layer a polymer layer (PS,) which in turn has an adhesive layer (KS) on each of its surfaces. The adhesive layer (KS) may each be a polyacrylate or a polyacrylate-based adhesive. In principle, any type of polymer can be used to prepare the polymer layer (PS). Examples of such polymers are poly(meth)acrylates, polyesters such as PET and/or PBT, polyvinylidene fluorides, polyvinylchlorides, polyamides and/or polyolefins. In particular, a polyester such as PET can be used. The polymer layer (PS) is an in-liner. The layer thickness of the polymer layer may be in a range from 5 to 55 µm, preferably from 6 to 50 µm, more preferably from 7 to 40 µm, in particular from 8 to 30 µm. Each of the adhesive layers (KS) may initially have a release liner for better handling, such as silicone paper. However, prior to use as an adhesive (K) in the process according to the invention, this release liner is removed.

Optional Steps (4) to (7) of the Method of the Invention for Producing the Composite (F1B1)

The composite (B1F1) used in step (1) of the method, and composed of a substrate (F1) and of an at least partially embossed and at least partially cured coating (B1), is preferably at least obtainable by steps (4) to (7) as specified in more detail hereinafter. FIG. 1 provides an exemplary illustration of steps (4) to (7) of the method of the invention, as is also evident from the description of this FIGURE below.

Step (4)

Step (4) of the method of the invention provides for application of a radiation-curable coating composition (B1a) to at least a part of a surface of a substrate (F1). The substrate (F1) constitutes a carrier material for the coating composition (B1a) or the coating (B1) to be applied thereto. The substrate (F1) may have been coated. The substrate (F1) is preferably a film, more preferably a film web, very preferably a continuous film web. Preferred material for the substrate (F1) is polyester, more particularly PET. The thickness of the substrate (F1) is preferably 2 µm up to 5 mm. Particularly preferred is a layer thickness of 25 to 1000 µm, more particularly 50 to 300 µm.

During implementation of step (4) (and preferably also during implementation of steps (5), (6) and (7) of the method), the substrate (F1) is preferably moved and is therefore a moving substrate. During the implementation of step (4), the substrate (F1) is moved preferably by means of a transport device such as a conveyor belt. The corresponding apparatus used for implementing step (4) therefore preferably comprises a transport device of this kind. The corresponding apparatus used for implementing step (4) further comprises a means for applying the preferably radiation-curable coating composition (B1a) to at least a part of a surface of the substrate (F1).

Step (5)

Step (5) of the method of the invention provides for at least partial embossing of the coating composition (B1a), applied at least partly to the surface of the substrate (F1), by means of at least one embossing tool (P1) having at least one embossing die (p1). The at least partial embossing transfers an embossed structure at least partially to the surface of the coating composition (B1a) applied to the substrate (F1). The term "embossing" has already been defined above. Accordingly, it refers, in connection with (B1a) or (B1), to the at least partial furnishing of the coating composition (B1a), as part of the composite (F1B1a), with an embossed structure. In this case at least a certain area of the coating composition (B1a) is furnished with an embossed structure. With preference, the entire surface of the coating composition (B1a), as part of the composite (F1B1a), is furnished with an embossed structure. During the implementation of step (5), the embossing tool (P1) is preferably pressured or pressed at least partly onto the applied coating composition (B1a).

Step (5) preferably transfers microstructures and/or nanostructures as embossed structure onto the coating composition (B1a).

The corresponding apparatus used for implementing step (5) therefore comprises a means for at least partially embossing the coating composition (B1a), applied at least partially to the surface of the substrate (F1), by means of at least one embossing tool (P1). The apparatus used preferably further comprises a means for pressing (P1) onto the substrate (F1), used preferably in the form of a continuous film web, after the application of the radiation-curable coating composition (B1a) to (F1), this means being situated preferably downstream of the means for applying the radiation-curable coating composition (B1a), as viewed in the direction of conveying of the substrate (F1).

The at least partial embossing as per step (5) of the method of the invention is carried out by means of an embossing tool (P1). (P1) may preferably be an embossing calender, which preferably comprises a grid application mechanism, more preferably a grid roll mechanism. This calender possesses counter-rotating or co-rotating rolls, preferably arranged above one another in the height direction with a certain spacing, and the composite (F1B1a) to be provided with an embossed structure is supplied to the rolls and is guided through the roll nip which forms, with the nip width being variably adjustable. The grid roll mechanism here preferably comprises a first roll such as a metallic roll, as for example a steel roll or nickel roll, including a roll made of nickel to which small amounts of phosphorus have been admixed, or else a quartz-based roll or a roll coated with at least one plastic, and a second roll. The first roll (embossing roll) functions here as the embossing tool (P1) and contains the positive form of the embossed structure which is to be embossed into the surface of the composite (F1B1a) and which then represents the corresponding negative structure. This corresponds in turn to the positive structure which is to be transferred onto the coating composition (B2a) in step (1) of the method. The embossing tool (P1) may itself have a structured coating such as a UV coating as an embossing die. The second roll serves as an impression or pressing roll. The negative form of the structure to be embossed is produced on the embossing tool (P1) according to the methods customary and known to the skilled person; depending on structure and materials, specific methods may be particularly advantageous. In accordance with the invention, this is preferably realized by the embossing roll acting as embossing tool (P1) and comprising an embossing die (p1). The composite (F1B1a) to be embossed, in the form for example of a film web coated at least partially with (B1a), is moved counter-directionally by means of the pressuring roll. At the point of the roll nip formed by the counter-rotating rolls disposed with a certain distance from one another, embossing takes place in accordance with step (5). The first roll, which carries the embossing die (p1), serves here for embossing the composite (F1B1a) which is guided by the second roll, opposite this embossing roll, with the second roll pressing the composite (F1B1a), to be provided with an embossed structure, against the first embossing roll. If necessary, step (5) may be carried out at elevated temperature, as for example at 30 to 100° C. or up to 80° C. In this case, the composite (F1B1a) for embossing runs first through a heating roll mechanism, followed optionally by irradiation with infrared light, before the actual embossing procedure, described above, takes place. After the embossing, the composite (F1B1a), which is then embossed, runs optionally through a cooling roll mechanism for cooling. Alternatively, step (5) may also take place with cooling: in this case, the composite (F1B1a) for embossing runs first through a cooling roll mechanism, before the actual embossing procedure described above takes place. The embossing tool (P1) used may also be a conventional press cylinder, which carries the negative form of the embossed structure to be embossed into the surface of the composite (F1B1a). This cylinder can be pressed onto the composite (F1B1a) for the at least partial embossing.

The at least one embossing die (p1) of the embossing tool (P1) used for the at least partial embossing in accordance with step (5) has a "positive structure" ("positive form"), i.e., it has the embossed structure exhibited by the coating (B2) which is obtained after implementation of step (3) of the method of the invention. The embossing tool (P1) is preferably a metallic embossing tool, more preferably made of nickel. Accordingly, the embossing die (p1) is preferably metallic, more preferably made of nickel, more particularly made of nickel which contains small amounts of phosphorus. Moreover, rolls may be employed that are coated with at least one plastic. Alternatively, however, soft materials such as polydimethylsiloxanes (PDMS), for example, may also be used for producing (p1). The coating composition (B1a) applied to (F1) exhibits a negative form of the embossed structure to be transferred, such as microstructures and/or nanostructures, after step (5) has been implemented.

The embossing die of the embossing tool used can optionally be pretreated before carrying out step (5) with the coating composition (B1a) used. Such a pretreatment comprises or is preferably a wetting of the embossing die with the coating composition (B1a).

Step (6)

Step (6) of the method of the invention provides for at least partial curing of the coating composition (B1a), applied to at least a part of the surface of the substrate (F1) and at least partially embossed, to give a composite (F1B1) composed of substrate (F1) and of at least partially embossed and at least partially cured coating (B1); throughout the duration of the curing, the coating composition (B1a) is in contact with the at least one embossing die (p1) of the at least one embossing tool (P1).

Steps (5) and (6) are preferably carried out concurrently. In that case the curing as per step (6) takes place preferably in situ during the implementation of step (5).

The corresponding apparatus used for implementing step (6) therefore preferably comprises at least one radiation source for irradiating the radiation-curable coating composition (B1a) with a curative radiation, preferably UV radiation.

Examples of suitable radiation sources for the radiative curing include low-pressure, medium-pressure and high-pressure mercury emitters and also fluorescent tubes, pulsed emitters, metal halide emitters (halogen lamps), lasers, LEDs and, moreover, electronic flash installations, enabling radiative curing without a photoinitiator, or excimer emitters. Radiative curing takes place through exposure to high-energy radiation, i.e., UV radiation or daylight, or by bombardment with high-energy electrons. The radiation dose typically sufficient for crosslinking in the case of UV curing is in the range from 80 to 3000 mJ/cm$^2$. It is of course also possible to use two or more radiation sources for the curing—two to four, for example. These sources may also each emit in different wavelength ranges.

The curing in step (6) takes place preferably by irradiation through the substrate (F1). In that case it is advantageous for the permeability of the substrate (F1) to the radiation used to be harmonized with that of the at least one photoinitiator used. Thus, for example, the material PET as substrate (F1), hence a PET film, for example, is permeable to radiation having a wavelength of below 300 nm. Photoinitiators which generate radicals with such radiation include, for example, 2,4,6-trimethylbenzoyldiphenylphosphine oxide, ethyl 2,4,6-trimethylbenzoylphenylphosphinate and bis(2,4,6-trimethylbenzoyl)phenylphosphine oxide.

Step (7)

Step (7) of the method of the invention provides for removal of the composite (F1B1) from the embossing tool (P1), so producing the desired product, namely the composite (F1B1) composed of substrate (F1) and of at least partially embossed and at least partially cured coating (B1).

BRIEF DESCRIPTION OF THE DRAWINGS

FIG. 1 shows schematically a side view of an apparatus which can be used for implementing steps (4) to (7) of the method of the invention for producing a composite (F1B1), i.e., for producing a master film, and which is used for exemplary illustration of the method of the invention in relation to steps (4) to (7). By means of this apparatus it is possible to transfer structures such as microstructures and/or nanostructures, by means of an embossing tool (P1), to a substrate (F1) coated with (B1a), and, after curing, to produce a composite (F1B1)—referred to as master film web (8) within FIG. 1—which can be used as master film.

The master transfer apparatus (30) shown in FIG. 1 operates according to a transfer principle wherein the desired negative structures are embossed directly, from a structured press cylinder or a press roll, which here is a master press cylinder (17), into the as yet uncured coating layer applied to the master film web (8b), corresponding to a composite (F1B1a), and this coating layer is then at least partially cured, with the structures applied thereon, curing taking place in situ by means of a lighting unit (3), to give the master film web (8)—corresponding to a composite (F1B1). In this method, the film web (8a) used as substrate (F1) is drawn off from a film web roller (18), which contains only the carrier material, in other words the pure film without applied master coating, and is guided via various deflection roller systems and web tensioning systems, and is introduced into an embossing region (1) of the apparatus. There, the film web (8a) runs into a region between a pressuring roll (4) and the master press cylinder (17), and is provided outside the press region, in the coating application device (27), with the as yet uncured master coating layer (corresponding to the coating composition B1a). This application of coating corresponds to step (4) of the method of the invention. In the embossing region (1), in which the master film web (8b) with the as yet uncured master coating layer runs along a section of the outer surface of the master press cylinder (17), the microstructures and/or nanostructures embossed into the outer surface of the master press cylinder (17) are introduced as a negative image into the master coating layer of the master film web (8b) and are transferred. This corresponds to step (5) of the method of the invention. The master film web (8b) comprising the uncured coating composition (B1a) is then cured, in accordance with step (6) of the method of the invention. Curing here takes place at least partially in situ by irradiation with a lighting unit (3), by means of UV radiation, as for example by means of a unit formed of UV-LEDs. The resulting master film (8), in other words the composite (F1B1), is subsequently taken off, in accordance with step (7) of the method of the invention, from the outer surface of the master press cylinder (17), and the master film web (8) thus completed is spooled up onto a film web roller (19). The film web roller (19) then contains the completed master film web (8) with the master coating layer applied thereon and with the negative images of the microstructures and/or nanostructures embossed therein. This film web roller (19) can be removed and then used in an apparatus for implementing steps (1) to (3) of the method of the invention.

Coating Compositions (B1a) and (B2a)
Coating Composition (B1a)

The coating composition (B1a) is a radiation-curable coating composition. The terms "radiation-curable" and "radiation-curing" are interchangeable here. The term "radiation curing" refers preferably to radical polymerization of polymerizable compounds by virtue of electromagnetic and/or particulate radiation, examples being (N)IR light in the wavelength range of $\lambda=>400\text{-}1200$ nm, preferably 700-900 nm, and/or UV light in the wavelength range of $\lambda=100$ to 400 nm, preferably of $\lambda=200$ to 400 nm and more preferably $\lambda=250$ to 400 nm, and/or electronic radiation in the range from 150 to 300 keV and more preferably with a radiation dose of at least 80, preferably 80 to 3000 mJ/cm$^2$. Radiation curing is carried out with particular preference using UV radiation. The coating composition (B1a) may be cured by use of a suitable radiation source. Consequently, (B1a) is preferably a UV radiation-curing coating composition.

The coating composition (B1a) comprises the at least one component (a) in an amount in a range from 40 to 95 wt %, preferably in a range from 45 or >45 to 90 wt %, more preferably in a range from 50 or >50 such as 55 to 85 wt %, very preferably in a range from 55 or 60 to 80 wt %,
  the at least one additive as component (b) in an amount in a range from 0.01 to 5 wt %, preferably in a range from 0.05 to 4.5 wt %, more preferably in a range from 0.1 to 4 wt %, very preferably in a range from 0.2 or 0.5 to 3 wt %,
  at least one photoinitiator as component (c) in an amount in a range from 0.01 to 15 wt %, preferably in a range from 0.1 to 12 wt %, more preferably in a range from 0.5 to 10 wt %,
  the at least one component (d), having at least one carbon double bond, in an amount in a range from 0 to 45 wt %, preferably in a range from 0 to 40 wt %, more preferably
  in a range from 0 to 35 wt %, very preferably in a range from 0 to 30 wt %,
  based in each case on the total weight of the coating composition (B1a).

The presence of component (d) in the inventively employed coating composition (B1a) is therefore merely optional, as evident from the lower limit of 0 wt % indicated respectively above. With preference, the coating composition (B1a) contains component (d) in an amount of up to 30 wt %, based on the total weight of the coating composition (B1a).

The components (a), (b), (c) and (d) are each different from one another. The stated amounts of the components (a), (b), (c) and (d) are based in each case on the total weight of the coating composition (B1a). The amounts of all the components present in the coating composition (B1a), i.e., the amounts of components (a), (b) and (c) and also optionally (d), and also of further components optionally present, in (B1a) add up to 100 wt %.

Component (a) has at least three structural units, in each case different from one another or at least partially identical, of the formula (I)

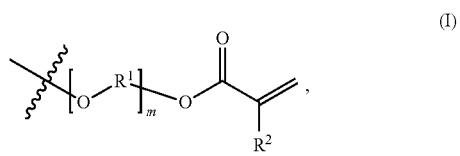

in which
  the radicals $R^1$ in each case independently of one another are a $C_2\text{-}C_8$ alkylene group, the radicals $R^2$ in each case independently of one another are H or methyl, and the parameters m each independently of one another are an integral parameter in a range from 1 to 15, preferably in a range from 1 to 10, more preferably in a range from 1 to 8 or 2 to 8, very preferably in a range from 1 to 6 or 2 to 6, more particularly in a range from 1 to 4 or 2 to 4, but with the proviso that in at least one of the structural units of the formula (I) the parameter m is at least 2, preferably at least 3.

Component (a) preferably has at least three identical structural units of the formula (I).

The symbol

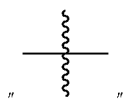

here stands for a bond of the respective radical to the superordinate structure of the component (a)—in other words, for example, for a bond of the radical $-[O-R^1]_m-O-C(=O)-C(R^2)=CH_2$ within the structural unit of the formula (I) to the superordinate structure of the component (a). This bonding takes place preferably via a linking of the oxygen atom of the radical $-[O-R^1]_m-$ to a carbon atom of the superordinate radical. Similar comments apply in respect of the other structural units of the formula (I). It is clear that all at least three structural units of the formula (I) are combined within a single component, namely component (a).

The component (a) preferably has precisely three structural units of the formula (I). In that case component (a) has precisely three functional (meth)acrylic groups. Alternatively, the structural units of the formulae (I) may each also be present more than three times as part of the component (a). In that case, for example component (a) may have more than three functional (meth)acrylic groups, as for example 4, 5 or 6 (meth)acrylic groups.

The aforementioned radicals $R^1$ each independently of one another are a $C_2$-$C_8$ alkylene group, preferably a $C_2$-$C_6$ alkylene group, more preferably a $C_2$-$C_4$ alkylene group, very preferably, each independently of one another, an ethylene group and/or a propylene group, especially preferably ethylene. In particular, all radicals $R^1$ are ethylene. Suitable as propylene groups in each case are radicals $R^1$ which have a structure $-CH_2-CH_2-CH_2-$ or a structure $-CH(CH_3)-CH_2-$ or a structure $-CH_2-CH(CH_3)-$. Particularly preferred in each case, however, is the propylene structure $-CH_2-CH_2-CH_2-$.

The parameters m, in each case independently of one another, are an integer in a range from 1 to 15. Since component (a) has at least three of the structural units of the formulae (I), and since the parameter m is at least 2 in at least one of the structural units of the formula (I), component (a) includes a total of at least four ether groups of the general formula "$-O-R^1-$".

With preference, component (a) in total has at least five, more preferably at least six, ether groups of the general formula "$-O-R^1-$". The number of ether groups of the general formula "$-O-R^1-$" within component (a) is situated preferably in a range from 4 to 18, more preferably in a range from 5 to 15, very preferably in a range from 6 to 12.

The fraction of the ether segments $-[O-R^1]_m$ present in the structural units of the formula (I) of component (a) is preferably in total at least 35 wt %, more preferably at least 38 wt %, very preferably at least 40 wt %, more preferably still at least 42 wt %, more particularly at least 45 wt %, based in each case on the total weight of component (a).

Component (a) preferably has a molecular weight ($M_n$) in the range from 300 to 2000 g/mol, more preferably from 350 to 1500 g/mol, more particularly from 400 to 1000 g/mol.

Particularly preferred for use as component (a) is at least one compound of the general formula (IVa) and/or (IVb),

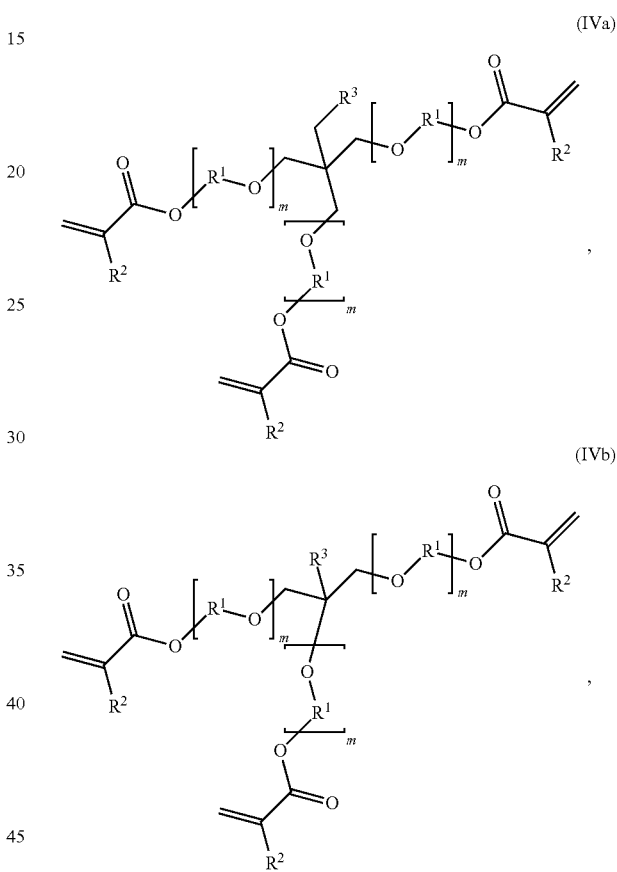

in which, in each case independently of one another, $R^1$ and $R^2$ and also m have the definitions given above in connection with the structural units (I), including the preferred embodiments thereof stated above, and $R^3$ is H, $C_1$-$C_8$ alkyl, OH or $O-C_{1-8}$ alkyl, more preferably is $C_1$-$C_4$ alkyl, OH or $O-C_{1-4}$ alkyl, and very preferably is $C_1$-$C_4$ alkyl or OH, or $R^3$ is the radical $-[O-R^1]_m-O-C(=O)-C(R^2)=CH_2$, in which $R^1$, $R^2$ and m have the definitions stated above in connection with the structural unit (I), including the preferred embodiments thereof stated above.

Very particular preference is given to the use as component (a) of at least one compound of the general formula (IVa) in which the radicals $R^1$ each independently of one another are a $C_2$-$C_8$ alkylene group, the radicals $R^2$ each independently of one another are H or methyl, the parameters m, in each case independently of one another, are an integral parameter in a range from 1 to 15, preferably in a range from 1 to 10, more preferably in a range from 1 to 8 or 2 to 8, very preferably in a range from 1 to 6 or 2 to 6, more particularly in a range from 1 to 4 or 2 to 4, but with the proviso that, in at least one and preferably in all of the structural units of the formula (I), the parameter m is at least 2.

$R^3$ is $C_1$-$C_8$ alkyl, OH or O—$C_{1-8}$ alkyl, more preferably $C_1$-$C_4$ alkyl, OH or O—$C_{1-4}$ alkyl, very preferably $C_1$-$C_4$ alkyl or OH.

Especially preferred for use as component (a) are (meth) acrylates of neopentyl glycol, trimethylolpropane, trimethylolethane or pentaerythritol with a total of 4-fold to 20-fold alkoxylation, or of 4-fold to 12-fold alkoxylation, such as ethoxylated, propoxylated or mixedly ethoxylated and propoxylated, and more particularly exclusively ethoxylated, neopentyl glycol, trimethylolpropane, trimethylolethane or pentaerythritol. The most preferred are corresponding (meth)acrylates deriving from correspondingly alkoxylated trimethylolpropane. Products of these kinds are available commercially and are sold for example under the designations Sartomer® SR 499 and Sartomer® SR 502 and also Sartomer® SR 415 and Sartomer® SR 9035 and also Sartomer® SR 501. In the sense of the present invention, the term "(meth)acrylic" or "(meth)acrylate" embraces not only methacrylic but also acrylic and not only methacrylate but also acrylate, respectively.

Aside from the optional component (d), the coating composition (B1a) preferably contains no component which has only exactly one or only exactly two ethylenically unsaturated groups such as (meth)acrylic groups. Where (B1a) has no component (d), therefore, (B1a) preferably contains no component which has only precisely one or only precisely two ethylenically unsaturated groups such as (meth)acrylic groups.

Component (b) is an additive. The concept of the additive is known to the skilled person, from Römpp Lexikon, "Lacke und Druckfarben", Thieme Verlag, 1998, page 13, for example. A preferred component (b) used is at least one rheology additive. This term as well is known to the skilled person, from Römpp Lexikon, "Lacke und Druckfarben", Thieme Verlag, 1998, page 497, for example. The terms "rheology additive", "rheological additive" and "rheology assistant" are interchangeable here. The additive used as component (b) is preferably selected from the group consisting of flow control agents, surface-active agents such as surfactants, wetting agents and dispersants, and also thickeners, thixotropic agents, plasticizers, lubricity and antiblocking additives, and mixtures thereof. These terms are likewise known to the skilled person, from Römpp Lexikon, "Lacke und Druckfarben", Thieme Verlag, 1998, for example. Flow control agents are components which by lowering the viscosity and/or surface tensions help coating compositions to form films which flow out evenly. Wetting agents and dispersants are components which lower the surface tension or, generally, the interfacial tension. Lubricity and antiblocking additives are components which reduce mutual sticking (blocking).

Examples of commercially available additives are the products Efka® SL 3259, Byk® 377, Tego® Rad 2500, Tego® Rad 2800, Byk® 394, Byk-SILCLEAN 3710, Silixan® A250, Novec FC 4430 and Novec FC 4432.

Preferred for use as additive (b) is at least one poly(meth) acrylate and/or at least one siloxane such as at least one oligosiloxane and/or polysiloxane and/or at least one fluorine-containing polymer such as a fluorine-containing, preferably aliphatic polyester. Particularly preferred as component (b) are siloxanes. Especially preferred for use are silicone (meth)acrylates.

For the curing by means of (N) IR and/or UV light, the coating composition (B1a) comprises at least one photoinitiator as component (c). This photoinitiator can be broken down, by light of the irradiated wavelength, into radicals, which are able in turn to initiate a radical polymerization. In the case of curing with electronic radiation, conversely, there is no need for the presence of such photoinitiators. The coating composition (B1a) preferably includes at least one photoinitiator as component (c) which can be broken down, by light of the irradiated wavelength, into radicals which are able in turn to initiate a radical polymerization.

Photoinitiators such as UV photoinitiators are known to the skilled person. Examples of those contemplated include phosphine oxides, benzophenones, α-hydroxyalkyl aryl ketones, thioxanthones, anthraquinones, acetophenones, benzoins and benzoin ethers, ketals, imidazoles or phenylglyoxylic acids and mixtures thereof.

Phosphine oxides are, for example, monoacyl- or bisacylphosphine oxides, as for example 2,4,6-trimethylbenzoyldiphenylphosphine oxide, ethyl 2,4,6-trimethylbenzoylphenylphosphinate or bis-(2,6-dimethoxybenzoyl)-2,4,4-trimethylpentylphosphine oxide. Benzophenones are, for example, benzophenone, 4-aminobenzophenone, 4,4'-bis(dimethylamino)benzophenone, 4-phenylbenzophenone, 4-chlorobenzophenone, Michler's ketone, o-methoxybenzophenone, 2,4,6-trimethylbenzophenone, 4-methylbenzophenone, 2,4-dimethyl-benzophenone, 4-isopropylbenzophenone, 2-chlorobenzophenone, 2,2'-dichlorobenzophenone, 4-methoxybenzophenone, 4-propoxybenzophenone or 4-butoxybenzophenone; α-hydroxyalkyl aryl ketones are, for example, 1-benzoylcyclohexan-1-ol (1-hydroxycyclohexyl phenyl ketone), 2-hydroxy-2,2-dimethylacetophenone (2-hydroxy-2-methyl-1-phenylpropan-1-one), 1-hydroxyacetophenone, 1-[4-(2-hydroxyethoxy)phenyl]-2-hydroxy-2-methyl-1-propan-1-one or a polymer containing in copolymerized form 2-hydroxy-2-methyl-1-(4-isopropen-2-ylphenyl)-propan-1-one. Xanthones and thioxanthones are, for example, 10-thioxanthenone, thioxanthen-9-one, xanthen-9-one, 2,4-dimethylthioxanthone, 2,4-diethyl-thioxanthone, 2,4-diisopropylthioxanthone, 2,4-dichlorothioxanthone or chloroxanthenone; anthraquinones are, for example, β-methylanthraquinone, tert-butylanthraquinone, anthraquinonecarboxylic esters, benz[de]anthracen-7-one, benz[a]anthracene-7,12-dione, 2-methylanthraquinone, 2-ethylanthraquinone, 2-tert-butylanthraquinone, 1-chloroanthraquinone or 2-amylanthraquinone. Acetophenones are, for example, acetophenone, acetonaphthoquinone, valerophenone, hexanophenone, α-phenylbutyrophenone, p-morpholinopropiophenone, dibenzosuberone, 4-morpholinobenzophenone, p-diacetylbenzene, 4'-metho- xyacetophenone, α-tetralone, 9-acetylphenanthrene, 2-acetylphenanthrene, 3-acetylphenanthrene, 3-acetylindole, 9-fluorenone, 1-indanone, 1,3,4-triacetylbenzene, 1-acetonaphthone, 2-acetonaphthone, 2,2-dimethoxy-2-phenylacetophenone, 2,2-diethoxy-2-phenylacetophenone, 1,1-dichloroacetophenone, 1-hydroxyacetophenone, 2,2-diet ho xyacetophenone, 2-methyl-1-[4-(methylthio)phenyl]-2-morpholinopropan-1-one, 2,2-dimethoxy-1,2-diph eny lethan-2-one or 2-benzyl-2-dimethylamino-1-(4-morpholi nophenyl) butan-1-one. Benzoins and benzoin ethers are, for example, 4-morpholinodeoxybenzoin, benzoin, benzoin isobutyl ether, benzoin tetrahydropyranyl ether, benzoin methyl ether, benzoin ethyl ether, benzoin butyl ether, benzoin isopropyl ether or 7H-benzoin methyl ether. Ketals are, for example, acetophenone dimethyl ketal, 2,2-diethoxyacetophenone, or benzil ketals, such as benzil dimethyl ketal. Photoinitiators which can also be used are, for example, benzaldehyde, methyl ethyl ketone, 1-naphthaldehyde, triphenylphosphine, tri-o-tolylphosphine or 2,3-butanedione. Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone and 4-methylbenzophenone and 2,4,6-trimethylbenzoyldiphenylphosphine oxide.

Preferred among these photoinitiators are 2,4,6-trimethylbenzoyldiphenylphosphine oxide, ethyl 2,4,6-trimethylbenzoylphenylphosphinate, bis(2,4,6-trimethyl-benzoyl) phenylphosphine oxide, benzophenone, 1-benzoyl-cyclohexan-1-ol, 2-hydroxy-2,2-dimethylacetophenone and 2,2-dimethoxy-2-phenylacetophenone. Preferably, therefore, at least one such photoinitiator is used as component (c). Component (c) is different from components (a), (b) and (d). Commercially available photoinitiators are, for example, the products Irgacure® 184, Irgacure® 500, Irgacure® TPO, Irgacure® TPO-L and Lucirin® TPO and also Darocure® 1173 from BASF SE.

As mentioned above, the use of the at least one component (d) is only optional. Component (d) has at least one, preferably terminal, carbon double bond. This is preferably a (meth)acrylic group. Component (d) preferably has one or two ethylenically unsaturated groups such as, for example, one or two or three or else more (meth)acrylic groups. It is also possible for two or more different components (d) to be used.

Examples of component (d) are mono-, di-, and/or trifunctional (meth)acrylic esters such as ethylene glycol di(meth)acrylate, 1,2-propanediol di(meth)acrylate, 1,3-propanediol di(meth)acrylate, 1,4-butanediol di(meth)acrylate, 1,3-butanediol di(meth)acrylate, 1,5-pentanediol di(meth)acrylate, 1,6-hexanediol di(meth)acrylate, 1,8-octanediol di(meth)acrylate, neopentyl glycol di(meth)acrylate, 1,1-, 1,2-, 1,3- and 1,4-cyclohexanedimethanol di(meth)acrylate, 1,2-, 1,3- or 1,4-cyclohexanediol di(meth)acrylate, tricyclodecanedimethanol di(meth)acrylate, trimethylolpropane tri(meth)acrylate, ditrimethylolpropane penta- or hexa(meth)acrylate, pentaerythritol tri- or tetra(meth)acrylate, glyceryl di- or tri(meth)acrylate, and also di- and poly(meth)acrylates of sugar alcohols, such as for example of sorbitol, mannitol, diglycerol, threitol, erythritol, adonitol (ribitol), arabitol (lyxitol), xylitol, dulcitol (galactitol), maltitol or isomalt, 2-phenoxyethyl (meth)acrylate, ethyl diglycol (meth)acrylate, 4-tert-butylcyclohexyl (meth)acrylate, trimethylolpropane formal mono(meth)acrylate, isobornyl (meth)acrylate, tetrahydrofurfuryl (meth)acrylate, 2-(2-ethoxyethoxy)ethyl (meth)acrylate and also lauryl, stearyl, isodecyl, octyl and decyl (meth)acrylate, esters of α,β-ethylenically unsaturated carboxylic acids, preferably of (meth)acrylic acid, with alcohols having 1 to 20 carbon atoms, preferably optionally hydroxy-substituted alkanols having 1 to 20 carbon atoms, e.g., methyl (meth)acrylic acid ester, ethyl (meth)acrylic acid ester, n-butyl (meth)acrylic acid ester, 2-ethylhexyl (meth)acrylic acid ester, 2-hydroxyethyl (meth)acrylate, 2-hydroxypropyl (meth)acrylate or 4-hydroxybutyl (meth)acrylate.

Especially preferred components (d) are 1,4-butanediol di(meth)acrylate and 1,6-hexanediol di(meth)acrylate and also tricyclodecanedimethanol di(meth)acrylate.

As component (d) it is also possible, additionally or alternatively, to use at least one polyester, polyether, carbonate, epoxide, poly(meth)acrylate and/or urethane (meth)acrylate, and/or unsaturated polyester resin.

Urethane (meth)acrylates are obtainable, for example, by reaction of polyisocyanates with hydroxyalkyl (meth)acrylates and optionally chain extenders such as diols, polyols, diamines, polyamines or dithiols or polythiols. Urethane (meth)acrylates dispersible in water without adding emulsifiers additionally contain ionic and/or nonionic hydrophilic groups, which are introduced into the urethane through synthesis components such as hydroxycarboxylic acids, for example. Such urethane (meth)acrylates contain essentially the following as synthesis components:

(a) at least one organic aliphatic, aromatic or cycloaliphatic di- or polyisocyanate, as for example at least one of the polyisocyanates described above in connection with the two-component coating materials, (b) at least one compound having at least one isocyanate-reactive group, preferably one of the hydroxyl-bearing monomers described above in connection with the polyacrylate polyols, and at least one radically polymerizable unsaturated group, and (c) optionally at least one compound having at least two isocyanate-reactive groups, as for example one of the polyhydric alcohols described above in connection with the polyesterols.

The urethane (meth)acrylates preferably have a number-average molar weight $M_n$ of 200 to 20 000, more particularly of 500 to 10 000, very preferably of 600 to 3000 g/mol (determined by gel permeation chromatography with tetrahydrofuran and polystyrene as standard). The urethane (meth)acrylates contain preferably from 1 to 5, more preferably from 2 to 4 mol of (meth)acrylic groups per 1000 g of urethane (meth)acrylate.

Epoxide (meth)acrylates are obtainable by reaction of epoxides with (meth)acrylic acid. Examples of epoxides contemplated include epoxidized olefins, aromatic glycidyl ethers or aliphatic glycidyl ethers, preferably those of aromatic or aliphatic glycidyl ethers. Examples of possible epoxidized olefins include ethylene oxide, propylene oxide, isobutylene oxide, 1-butene oxide, 2-butene oxide, vinyloxirane, styrene oxide or epichlorohydrin; ethylene oxide, propylene oxide, isobutylene oxide, vinyloxirane, styrene oxide or epichlorohydrin are preferred, ethylene oxide, propylene oxide or epichlorohydrin are particularly preferred, and ethylene oxide and epichlorohydrin are especially preferred. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy) phenyl]octahydro-4,7-methano-5H-indene, tris[4-(2,3-epoxypropoxy)phenyl]methane isomers, phenol-based epoxy novolacs and cresol-based epoxy novolacs. Aliphatic glycidyl ethers are, for example, 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane, diglycidyl ethers of polypropylene glycol (α,ω-bis(2,3-epoxypropoxy) poly(oxypropylene)) (and of hydrogenated bisphenol A (2,2- bis[4-(2,3-epoxypropoxy)cyclohexyl]propane)). The epoxide (meth)acrylates preferably have a number-average molar weight $M_n$ of 200 to 20 000, more preferably of 200 to 10 000 g/mol and very preferably of 250 to 3000 g/mol; the amount of (meth)acrylic groups is preferably 1 to 5, more preferably 2 to 4, per 1000 g of epoxide (meth)acrylate (determined by gel permeation chromatography with polystyrene as standard and tetrahydrofuran as eluent).

(Meth)acrylated poly(meth)acrylates are the corresponding esters of $\alpha,\beta$-ethylenically unsaturated carboxylic acids, preferably of (meth)acrylic acid, more preferably of acrylic acid, with polyacrylate polyols, obtainable by esterifying poly(meth)acrylate polyols with (meth)acrylic acid. The polyacrylate polyols may for example be those as described above in connection with the two-component coating materials.

Carbonate (meth)acrylates are available with various functionalities. The number-average molecular weight $M_n$ of the carbonate (meth)acrylates is preferably less than 3000 g/mol, more preferably less than 1500 g/mol, very preferably less than 800 g/mol (determined by gel permeation chromatography with polystyrene as standard and tetrahydrofuran solvent). The carbonate (meth)acrylates are obtainable in a simple way by transesterification of carbonic esters with polyhydric, preferably dihydric, alcohols (diols, e.g., hexanediol) and subsequent esterification of the free OH groups with (meth)acrylic acid or else transesterification with (meth)acrylic esters, as described for example in EP 0 092 269 A1. They are also obtainable by reaction of phosgene, urea derivatives with polyhydric alcohols, dihydric alcohols for example. Also conceivable are (meth)acrylates of polycarbonate polyols, such as the reaction product of one of the stated diols or polyols and a carbonic ester and also a hydroxyl-containing (meth)acrylate. Examples of suitable carbonic esters are ethylene, 1,2- or 1,3-propylene carbonate, dimethyl, diethyl or dibutyl carbonate. Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glyceryl mono- and di(meth) acrylate, trimethylolpropane mono- and di(meth)acrylate and also pentaerythritol mono-, di- and tri(meth)acrylate. With preference, the carbonate (meth)acrylates are aliphatic carbonate (meth)acrylates.

Unsaturated polyester resins are preferably synthesized from the following components:
 (a1) maleic acid or derivatives thereof,
 (a2) at least one cyclic dicarboxylic acid or derivatives thereof,
 (a3) at least one aliphatic or cycloaliphatic diol.
Derivatives here refer preferably to
 the relevant anhydrides in monomeric or else polymeric form,
 monoalkyl or dialkyl esters, preferably mono- or di-$C_1$-$C_4$ alkyl esters, more preferably monomethyl or dimethyl esters or the corresponding monoethyl or diethyl esters, additionally, monovinyl and divinyl esters, and also
 mixed esters, preferably mixed esters with different $C_1$-$C_4$ alkyl components, more preferably mixed methyl ethyl esters.

If (B1a) includes a component (d), that component is preferably at least one urethane (meth)acrylate.

The coating composition (B1a) may comprise at least one further component (e), different from the components (a) to (d), such as, for example, fillers, pigments, thermally activatable initiators such as, for example, potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzopinacol, cumene hydroperoxide, dicumyl peroxide, tert-butyl perbenzoate, silylated pinacols, hydroxyl-containing amine N-oxides, such as 2,2,6,6-tetramethylpiperidine-N-oxyl and 4-hydroxy-2,2,6,6-tetramethylpiperidine-N-oxyl, and organic solvents, and also stabilizers. Preferably, however, there are no organic solvents included in (B1a). Component (e) may be present in an amount in a range from 0 to 15 wt %, preferably in a range from 0 to 12 wt %, more preferably in a range from 0 to 10 wt % in (B1a), based in each case on the total weight of the coating composition (B1a).

The solids content of the coating composition (B1a) is preferably ≥80 wt %, more preferably ≥90 wt %, very preferably ≥95 wt %, more particularly ≥98 or ≥99 wt %, most preferably 100 wt %, based in each case on the total weight of the coating composition (B1a). The solids content here is determined by the method described below.

The coating composition (B1a) preferably contains no thiols, and especially no trimethylolpropane tris(3-mercaptopropionate).

The double bond conversion of the at least partially cured coating (B1) obtained from (B1a) is preferably at least 70%, more preferably at least 75%, more preferably still at least 80%, very preferably at least 85%, more particularly at least 90%.

Coating Composition (B2a)

Any kind of coating composition may be employed as coating composition (B2a) in step (1) of the method of the invention. The coating composition (B2a) may be a physically drying, thermally curable, chemically curable and/or radiation-curable coating composition (B2a). With preference, the coating composition (B2a) is a chemically curable, a thermally curable and/or radiation-curable coating composition, more preferably a radiation-curable coating composition. Accordingly, the at least partial curing as per step (3) takes place preferably by means of radiation curing. The coating composition (B2a) may be identical to the coating composition (B1a). Preferably, however, (B2a) is different from (B1a). (B2a) is preferably constructed from the alike, but not the same, components (a) to (e) also used in the preparation of (B1a), although the quantity provisos relating to (B1a) do not have to apply to (B2a).

Physical drying here refers preferably to the simple evaporation of solvent (s) to form the coating (B2). Thermal curing here preferably entails a curing mechanism which is attributable to a temperature above room temperature (>23° C.). This may be, for example, the formation of radicals or ions, preferably radicals from an initiator which breaks down at the elevated temperatures and so initiates a radical or ionic polymerization. Examples of such thermally activatable initiators are those which have a half-life at 80° C. of less than 100 hours. Chemical curing refers preferably to the reaction of at least two different and mutually complementary reactive functional groups, in the manner, for example, of a polycondensation such as a reaction of an —OH group with a —COOH group, or of a polyaddition (reaction of an NCO group with an —OH or amino group).

If the coating composition (B2a) is a physically drying, thermally curable and/or chemically curable coating composition, it is prepared using, as binder, at least one customary polymer known to the skilled person. This binder then preferably has crosslinkable functional groups. Any customary crosslinkable functional group known to the skilled person is suitable in this context. More particularly, the crosslinkable functional groups are selected from the group consisting of hydroxyl groups, amino groups, carboxylic acid groups, isocyanates, polyisocyanates and epoxides. The polymers are preferably curable or crosslinkable exothermically or endothermically, preferably in a temperature range from −20° C. up to 250° C., or from 18° C. to 200° C. Especially suitable as polymers are at least one polymer selected from the group consisting of polyurethanes, polyethers, polyesters, polyamides, polyureas, polyvinyl chlorides, polystyrenes, polycarbonates, poly(meth)acrylates, epoxy resins, phenol-formaldehyde resins, melamine-formaldehyde resins. These polymers may in particular be OH-functional. In that case they may be subsumed by the general term "polyols". Such polyols may for example be polyacrylate polyols, polyester polyols, polyether polyols, polyurethane polyols, polyurea polyols, polyester-polyacrylate polyols, polyester-polyurethane polyols, polyurethane-polyacrylate polyols, polyurethane-modified alkyd resins, fatty acid-modified polyester-polyurethane polyols, and also mixtures of the stated polyols. Preferred are polyacrylate polyols, polyester polyols and polyether polyols.

It is possible here to use at least one polymer which is cured with participation of isocyanate and/or oligomerized isocyanate groups, very preferably at least one corresponding polyurethane and/or at least one corresponding polyurea (e.g., what are called "polyaspartic binders"). Polyaspartic binders are components which are converted from reaction of amino-functional compounds, especially secondary amines, with isocyanates. If at least one polyurethane is used, then those suitable especially are polyurethane-based resins which are preparable by a polyaddition reaction between hydroxyl-containing components such as polyols and at least one polyisocyanate (aromatic and aliphatic isocyanates, di-, tri- and/or polyisocyanates). Customarily here a stoichiometric reaction of the OH groups in the polyols with the NCO groups in the polyisocyanates is required. However, the stoichiometric ratio to be used can also be varied, since the polyisocyanate can be added to the polyol component in amounts such that there may be an "over crosslinking" or an "under crosslinking". If epoxy resins are used, i.e. epoxide-based resins, then those suitable are preferably epoxide-based resins which are prepared from glycidyl ethers which have terminal epoxide groups and, within the molecule, hydroxyl groups as functional groups. These are preferably reaction products of bisphenol A and epichlorohydrin and/or of bisphenol F with epichlorohydrin, and mixtures thereof, which are also used in the presence of reactive diluents. The curing or crosslinking of such epoxide-based resins is accomplished customarily by a polymerization of the epoxide groups of the epoxide ring, by a polyaddition reaction in the form of an addition reaction of other reactive compounds, as hardeners, in stoichiometric amounts with the epoxide groups, in which case, accordingly, the presence of one active hydrogen equivalent per epoxide group is required (i.e., one H-active equivalent is needed for curing per epoxide equivalent), or by a polycondensation via the epoxide groups and the hydroxyl groups. Examples of suitable hardeners are polyamines, especially (hetero)aliphatic, (hetero)aromatic and (hetero)cycloaliphatic polyamines, polyamidoamines, polyaminoamides, and also polycarboxylic acids and their anhydrides.

The concept of "radiation curing" has already been described above in connection with the coating composition (B1a). The coating composition (B2a) may be cured by use of a radiation source, preferably by using UV radiation. Preferably, therefore, (B2a) is a UV radiation-curing coating composition.

(B2a) preferably therefore has unsaturated carbon double bonds, more preferably (meth)acrylic groups. For this purpose, the coating composition (B2) may comprise any of the components identified above in connection with (B1a) and subsumable under the components (a) and (d) of (B1a), such as, in particular, polyester, polyether, carbonate, epoxide, poly(meth)acrylate and/or urethane (meth)acrylates and/or at least one unsaturated polyester resin and/or mono-, di- and/or tri-functional (meth)acrylic esters.

On curing by means of (N)IR and/or UV light, the coating composition (B2a) preferably comprises at least one photoinitiator which is able to be broken down into radicals by light of the irradiated wavelength, these radicals then being able to initiate a radical polymerization. In the case of curing with electronic radiation, in contrast, the presence of such photoinitiators is not necessary. As photoinitiators it is possible to use the same components in the same quantities as stated above in connection with component (c) of the coating composition (B1a).

The coating composition (B2a) may comprise at least one further additive, moreover. In that case it is possible to use the same components in the same amounts as identified above in connection with the components (b) and (e) of the coating composition (B1a).

The coating composition used as coating composition (B2a) is more preferably one having (meth)acrylic groups. With preference this coating composition (B2a) comprises at least one urethane (meth)acrylate. Preferably, moreover, it includes at least one photoinitiator.

Composite (B2B1F1) of the Invention

A further subject of the present invention, moreover, is a composite (B2B1F1) which is composed of a substrate (F1), of an at least partially embossed and at least partially cured coating (B1), and of a coating (B2) applied to (B1) and at least partially cured, where the coating (B1) is producible by at least partially curing a coating composition (B1a), applied to at least a part of a surface of the substrate (F1) and at least partially embossed, by radiation curing, where the coating composition (B1a) is a radiation-curable coating composition wherein the coating composition (B1a) comprises
at least one component (a) in an amount in a range from 40 to 95 wt %,
at least one additive as component (b) in an amount in a range from 0.01 to 5 wt %,
at least one photoinitiator as component (c) in an amount in a range from 0.01 to 15 wt %, and
at least one component (d), comprising at least one carbon double bond, in an amount in a range from 0 to 45 wt %,
where (i) the components (a), (b), (c), and (d) are each different from one another, (ii) the stated amounts of the components (a), (b), (c), and (d) are each based on the total weight of the coating composition (B1a), and (iii) the amounts of all components present in the coating composition (B1a) add up to 100 wt %,
and where component (a) comprises at least three structural units, each different from one another or at least partially identical, of the formula (I)

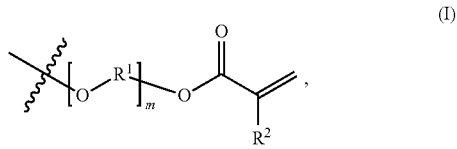

in which
the radicals $R^1$ in each case independently of one another are a $C_2$-$C_8$ alkylene group,
the radicals $R^2$ in each case independently of one another are H or methyl, and
the parameters m each independently of one another are an integral parameter in a range from 1 to 15, but with the proviso that the parameter m is at least 2 in at least one of the structural units of the formula (I) within the component (a).

All preferred embodiments described hereinabove in connection with the method of the invention, especially in connection with the coating compositions (B1a) and (B2a) used therein and with the substrate (F1) and also with the coatings (B1) and (B2), are also preferred embodiments in relation to the composite (B2B1F1) of the invention.

The composite (B1F1) of this composite (B2B1F1) is obtainable preferably by implementation of the above-described method steps (4) to (7).

The composite (B2B1F1) is obtainable preferably by implementation of the above-described method steps (1) and (2).

The substrate (F1) is preferably a film web, more preferably a continuous film web.

Uses

A further subject of the present invention is a use of the composite (B2B1F1) of the invention for producing a coating (B2), at least partially embossed on one of its surfaces, in the form of a free film, or for producing a composite (B2KF2) composed of a substrate (F2), at least one adhesive (K), and the coating (B2). This composite (B2KF2) is obtained preferably by traversal of the method stages (3a), (3b), and (3c), specifically by (3a) applying an adhesive (K) to at least a part of the surface of the composite (B2B1F1), on its side having the coating (B2), to give a composite (KB2B1F1), (3b) applying a substrate (F2) to the composite (KB2B1F1) obtained after stage (3a), to at least a part of its surface having the adhesive (K), or vice-versa, to give a composite (F2KB2B1F1), and (3c) peeling the composite (B1F1) from the composite (F2KB2B1F1) to give a composite (F2KB2), where the coating (B2) of this composite has on its surface at least partially the mirror image of the at least partially embossed surface of the coating (B1) of the composite (B1F1).

All preferred embodiments described hereinabove in connection with the method of the invention and the composite (F1B1) and (B2B1F1) of the invention are also preferred embodiments in relation to the aforementioned uses.

The coating composition (B2a) here is preferably a radiation-curable coating composition.

Methods of Determination

1. Determining the Nonvolatile Fraction

The nonvolatile fraction (the solids or solids content) is determined according to DIN EN ISO 3251 (date: June 2008). The method involves weighing out 1 g of sample into an aluminum tray that has been dried beforehand and drying the sample in a drying cabinet at 125° C. for 60 minutes, cooling it in a desiccator, and then reweighing it. The residue, relative to the total amount of sample employed, corresponds to the nonvolatile fraction.

2. Determining the Modeling Accuracy

The modeling accuracy is determined by means of a commercial atomic force microscope (AFM) and using a commercial cantilever. By means of AFM it is possible accordingly to compare, for example, the surface topography of a defined lattice structure such as that of the embossing tool P1, having a depth of 140 nm, for example, and a period of 430 nm, for example, with the surface topography of a master film (B1F1) after embossing. In this case the embossing tool is deliberately damaged at a particular site in order to define a reference point. By means of this reference point it is possible to investigate and compare with one another the same regions of the reference and of the replication. The modeling accuracy defines how accurately a particular reference structure can be transferred, such as from the embossing tool P1 to a master film (B1F1), for example. If, for example, the investigated region of the embossing tool P1 features a lattice structure having a depth of 140 nm, then this reference depth is compared with the corresponding height of the structure determined on the master film (B1F1). The percentage change, corresponding here to the modeling accuracy, is defined as:

$$\Delta h = 100 * \left(1 - \frac{h_m}{h_r}\right)$$

$\Delta h$ corresponds here to the percentage change, $h_m$ to the height of the structure in the investigated region of the master film, and $h_r$ to the corresponding depth of the structure of the investigated region of the embossing tool. This percentage change, in other words the modeling accuracy, is also referred to as 'contraction'. The smaller the values of $\Delta h$, the better the modeling accuracy.

3. Determining the Flow Time

The flow time is determined in accordance with DIN EN ISO 2431 (date: March 2012). The method involves determining the flow time by means of a 4 mm flow cup (No. 4) at room temperature (20° C.).

4. Determining the Double Bond Conversion

The double bond conversion (DB conversion) is determined by ATR-IR spectroscopy after curing of the sample under investigation. With the technique of ATR-IR spectroscopy, an IR spectrum is recorded at the site of contact of a round reflection crystal with the substrate. The contact site has a diameter of around 200 µm and the reflection crystal used is a germanium crystal.

The starting material used for calculating the double bond conversion comprises the corresponding wet specimens of the sample. The DB conversion is calculated by way of the decrease in intensity of the band at 810 cm$^{-1}$. A band used for standardization is an ester band at 1730 cm$^{-1}$. The percentage double bond conversion is calculated by the following formula:

$$DB-\text{conversion} = 100 * \left(1 - \frac{I_{810\ cm-1}}{I_{Ref-810\ cm-1}}\right)$$

Here, $I_{810cm-1}$ is the standardized intensity at 810 cm$^{-1}$ of the cured layer, and $I_{Ref-810cm-1}$ is the standardized intensity at 810 cm$^{-1}$ of the corresponding wet specimen. A double bond conversion 90% is classed as sufficient.

5. Determining the Adhesion

The adhesion is determined in accordance with DIN EN ISO 2409 (date: June 2013) by means of the cross-cut test.

In this test, in a duplicate determination, the adhesion of the coating layer under investigation to the substrate is examined. A cross-cut tester from Byk Gardner with a 2 mm cut spacing is used manually. Subsequently, Tesa tape No. 4651 is pressed onto the damaged area and peeled off to remove the delaminated regions. The assessment is made on the basis of characteristic values ranging from 0 (minimal delamination) to 5 (very high delamination). An average value of at least 3.5 is classed as sufficient.

6. Determining the Success of Replication

The success of replication is determined visually, with the percentage fraction of successfully replicated area being ascertained. The range here lies between 0% to 100% of successfully replicated area. If 100% of the area is not replicated, this means that a corresponding fraction of the area could not be removed from the embossing die, in other words that the coating B1 in the form of B1F1 remained partially adhering to the embossing tool P1, or that the coating B2 remained partially adhering to the master film B1F1.

EXAMPLES

The inventive and comparative examples below serve to illustrate the invention, but should not be interpreted as imposing any restriction.

Unless otherwise indicated, the amounts in parts are parts by weight and amounts in percent are in each case percentages by weight.

1. Ingredients and Materials Used

Hostaphan® GN—commercially available PET film with a layer thickness of 125 µm.
Laromer® UA 9033 (L UA 9033)—aliphatic urethane acrylate from BASF SE, employable as component (d)
Hexanediol diacrylate (HDDA)—employable as component (d)
Sartomer® 395 (SR 395)—isodecyl acrylate from Sartomer, employable as component (d)
Sartomer® 502 (SR 502)—TMPTA (trimethylolpropane triacrylate) with 9-fold ethoxylation, from Sartomer, employable as component (a)
Sartomer® 499 (SR 499)—TMPTA (trimethylolpropane triacrylate) with 6-fold ethoxylation, from Sartomer, employable as component (a)
Sartomer® 454 (SR 454)—TMPTA (trimethylolpropane triacrylate) with 3-fold ethoxylation, from Sartomer, employable as comparative component (a)
TMPTA (trimethylolpropane triacrylate)—employable as comparative component (a)
GPTA (glyceryl propoxytriacrylate)—glyceryl triacrylate with 3-fold propoxylation, employable as comparative component (a)
Irgacure® 184 (I-184)—commercially available photoinitiator from BASF SE, employable as component (c)
Irgacure® TPO-L (I-TPO-L)—commercially available photoinitiator from BASF SE, employable as component (c)
Tego® Rad 2500 (TR 2500)—lubricity and antiblocking additive from Evonik (silicone acrylate), employable as component (b)
Byk-SILCLEAN 3710 (BS 3710)—surface additive from BYK Chemie GmbH (polyether-modified acrylic-functional polydimethylsiloxane), employavle as component (b)

2. Examples 2.1 Production of Coating Compositions (B1a) and Corresponding Comparative Coating Compositions The coating compositions were produced in accordance with tables 1a and 1b below. Coating compositions E1a to E3a as well as E4a to E6a are inventive. Coating compositions V1a to V5a are comparative coating compositions. The flow times ascertained at room temperature (20° C.) are in the range from 26 to 172 s in the case of the production of E1a to E3a and V1a to V5a.

TABLE 1a

| Coating composition | Component (a) or comparative component (a) | Component (b) | Component (d) | Component (c) |
| --- | --- | --- | --- | --- |
| E1a | SR 499 (65 parts) | TR 2500 (1 part) | L UA 9033 (13.5 parts) and HDDA (13.5 parts) | I-184 (3.5 parts) and I-TPO-L (3.5 parts) |
| E2a | SR 499 (92 parts) | TR 2500 (1 part) | — | I-184 (3.5 parts) and I-TPO-L (3.5 parts) |
| E3a | SR 502 (65 parts) | TR 2500 (1 part) | L UA 9033 (13.5 parts) and HDDA (13.5 parts) | I-184 (3.5 parts) and I-TPO (3.5 parts) |
| V1a | SR 499 (65 parts) | — | L UA 9033 (13.5 parts) and HDDA (13.5 parts) | I-184 (3.5 parts) and I-TPO-L (3.5 parts) |
| V2a | SR 454 (65 parts) | TR 2500 (1 part) | L UA 9033 (13.5 parts) and HDDA (13.5 parts) | I-184 (3.5 parts) and I-TPO (3.5 parts) |
| V3a | TMPTA (50 parts) | TR 2500 (1 part) | L UA 9033 (26 parts) and SR 395 (16 parts) | I-184 (3.5 parts) and I-TPO-L (3.5 parts) |
| V4a | GPTA (50 parts) | TR 2500 (1 part) | L UA 9033 (26 parts) and SR 395 (16 parts) | I-184 (3.5 parts) and I-TPO-L (3.5 parts) |
| V5a | SR 499 (32 parts) | TR 2500 (1 part) | L UA 9033 (30 parts) and HDDA (30 parts) | I-184 (3.5 parts) and I-TPO-L (3.5 parts) |

TABLE 1b

| Coating composition | Component (a) | Component (b) | Component (d) | Component (c) |
|---|---|---|---|---|
| E4a | SR 499 (65 parts) | TR 2500 (0.5 parts) | L UA 9033 (13.5 parts) and HDDA (13.5 parts) | I-184 (3.5 parts) and I-TPO-L (3.5 parts) |
| E5a | SR 499 (65 parts) | TR 2500 (2 parts) | L UA 9033 (13.5 parts) and HDDA (13.5 parts) | I-184 (3.5 parts) and I-TPO-L (3.5 parts) |
| E6a | SR 499 (65 parts) | BS 3710 (1 part) | L UA 9033 (13.5 parts) and HDDA (13.5 parts) | I-184 (3.5 parts) and I-TPO-L (3.5 parts) |

2.2 Production of Master Films (B1F1) Using E1a to E3a and V1a to V5a as Well as E4a to E6a A number of different master films are produced using a roll-to-plate embossing apparatus with a nickel embossing tool P1 bearing the desired positive structure. For this purpose, one each of the above-described coating compositions E1a to E3a and V1a to V5a as well as E4a to E6a is applied to P1, and a PET film (F1) is applied over it (Hostaphan® GN). The resulting stack of film and respective coating composition then runs through beneath a pressing roll and, still while the embossing apparatus is in contact with the coating composition of the respective stack, the coating compositions are at least partially cured by means of a UV-LED lamp. The lamp used in this case is a 365 nm, 6 W UV-LED lamp from Easytec (100% lamp power, 2 m/min, 2 passes). The at least partially cured coating together with film, with the negative structure by comparison with P1, is subsequently separated from the embossing apparatus, to give the structured film (master film). The master films are subsequently post-exposed with a UVA lamp (Panacol-Elosal UV F-900).

Further, a master film is produced by using a roll-to-roll embossing apparatus having an embossing tool P1 made of nickel bearing the desired positive structure. For this purpose, the coating composition E1a described above is applied to a PET film (F1) (Hostaphan® GN) and passed over the embossing tool P1 with the aid of a pressing roll. Even while the embossing apparatus is in contact with the coating composition, the at least partial curing of the coating composition is effected by a UV-LED lamp. A 365 nm, 6 W UV-LED lamp from Easytec (100% lamp power, 5 m/min) is used. Subsequently, the at least partially cured coating together with the film is separated from the embossing apparatus with the negative structure by comparison with P1, and the structured film (master film) is obtained. The master film is subsequently post-exposed with a UVA lamp (Panacol-Elosal UV F-900).

2.3 Master Films Produced

In the manner described in section 2.2, various sets of master films are obtained (E1F1 to E3F1 and V1F1 to V5F1 as well as E4F1 to E6F1), additionally differing in their embossing according to the nature of the positive structure. In this case, embossing apparatuses of nickel with different positive structures were used, specifically with

- a nanostructure (lattice structure with a period of 430 nm and a depth of 140 nm; the respective coating composition is applied in layer thicknesses between 5-10 µm to the PET film employed),
- a microstructure M1 (two-dimensional triangle structure with a width and height of 33 µm and a space of 35 µm between the structures; the respective coating composition is applied in layer thicknesses of 20 µm to the PET film employed),
- a microstructure A (continuous two-dimensional triangular structure with a width of 45 µm and a height of 13 µm, the respective coating composition is applied in layer thicknesses of 20 µm to the PET film used), or with
- a microstructure B (two-dimensional triangular structure with a height of 80 µm and 115 µm space between the structures, the respective coating composition being applied to the employed PET film in layer thicknesses of 110 µm.

The master films with the nanostructure are used for determining the modeling accuracy, the double bond conversions, and the adhesion. The master films with the microstructure M1 are used for determining the success of replication—see. Point 2.4—and also used for the production of transfer films as described below under points 2.5 to 2.7. The master films with the microstructures A or B are used for the production of transfer films as described in Section 2.8 below. For producing these master films, the coating composition E1a is used in each case and correspondingly master films E1F1 with microstructure A or B are obtained.

2.4 Investigations on the Master Films Table 2 below summarizes the investigations conducted. The investigations were each conducted in accordance with the methods described above. The symbol "-" within the table denotes that the particular investigation was not carried out.

TABLE 2

| Master film | DB conversion (%) | Adhesion | Success of replication (%) | Modeling accuracy (Δh, %) |
|---|---|---|---|---|
| E1F1 | 92 | 3.5 | 100 | 4 |
| E2F1 | 90 | 0.5 | 100 | 4 |
| E3F1 | 95 | 2.5 | — | 4 |
| V1F1 | 93 | 5 | 100 | 3 |
| V2F1 | 85 | 1.5 | 85 | 2 |
| V3F1 | 89 | 5 | 85 | 5 |
| V4F1 | 92 | 5 | 100 | 4 |
| V5F1 | 87 | 5 | 85 | 29 |

The data show that, in the case of V2F1, V3F1 and V5F1, there is no attainment of sufficient DB conversion (DB conversion <90). With too low a DB conversion, problems may occur in the embossing both of the coating composition (B1a) and also, later on, of the coating composition (B2a). The master films E1F1, E2F1 and E3F1, conversely, show DB conversions of at least 90%.

In the case of V1F1 and V4F1, the DB conversions are indeed >90%, but the adhesion achieved with these master films, just as with V3F1 and V5F1, is inadequate (cross-cut test evaluated with a rating of 5). If adhesion of the master coating on the PET film is insufficient, problems may occur during embossing both of the coating composition (B1a) and also, later on, of the coating composition (B2a). The master films E1F1, E2F1 and E3F1, conversely, all exhibit good to sufficient adhesion properties.

The data additionally show that, in the case of V2F1, V3F1 and V5F1, only values of 85% are obtained in the assessment of the success of replication, since 15% of the respective coating V2, V3 and V5 could not be removed from the embossing tool. Conversely, the investigated master films E1F1 and E2F1 exhibit a replication success of 100%.

Apart from V5F1, all of the master films investigated exhibit sufficient modeling accuracy, since very low contraction values are obtained consistently. Only in the case of V5F1 is a contraction of 29% obtained, which is unacceptable.

In summary it can be stated that only the master films E1F1, E2F1 and E3F1 furnish good results in respect of all of the properties investigated (DB conversion, adhesion, modeling accuracy, and success of replication)

2.5 Production of Transfer Films:

The master films obtained respectively with the microstructure are then each used in a roll-to-plate embossing apparatus, and a coating composition (B2a) is applied with a wet layer thickness of 20 µm to the structured surface of the respective master film. The resulting stack of master film and coating composition (B2a) is lined with a TAC film to protect against oxygen. The stack obtained in turn, comprising master film, coating composition (B2a) applied thereto, and TAC film applied to the coating composition, then runs through beneath a pressing roll, in a process simultaneous with the at least partial curing of the coating composition (B2a) by a UV-LED lamp. The lamp used in this case is a 365 nm, 6 W UV-LED lamp from Easytec (100% lamp power, 2 m/min, 2 passes). In this way, following removal of the TAC film, a composite (B2B1F1) is obtained as a transfer film stack.

The coating composition (B2a) employed is a commercial, radiation-curing coating composition which comprises at least one urethane acrylate, at least one photoinitiator and also commercial additives.

2.6 Production of Bonded Composites and Free Structured Films:

The unstructured, coated side of the coating (B2) of the transfer film (B2B1F1) is then adhered by means of a laminating film (mount laminating film S-4705 WSA 120P from ATP; polyacrylate) to a coated steel plate. The laminating film used consists of an adhesive film K, lined on either side initially in each case with a silicone paper in order to protect against unintended sticking. For this purpose, the silicone paper is first of all peeled from one of the sides and, parallel to the direction of peeling of the silicone paper, the adhesive film is brought, with its now exposed adhesive side, onto the coated side of the coating (B2) of the transfer film (B2B1F1), by pressing the adhesive film onto B2 with a rubber roller. Similarly, then, the silicone paper is peeled off from the other side and, parallel to the direction of peeling of the silicone paper, the adhesive film is pressed by its final adhesive side, now exposed, onto a surface of the steel plate as substrate F2, using a rubber roller. The resulting composite (F2KB2B1F1) is first stored at 50° C. for 12 hours. Following this storage, the respective master film (B1F1) is peeled from the aforesaid composite, to give not only the master film but also the composite (F2KB2).

In order to obtain a free structured film, the coating (B2) can be separated from the bonded steel plate (F2KB2).

2.7 Investigations on the Bonded Composites (F2KB2) or on the Free Structured Film (B2)

Table 3 below summarizes the results of the investigations of the success of replication performed on the resultant transfer films, taking account of the particular master film used for embossing. The symbol "-" within the table denotes that the particular investigation was not carried out.

TABLE 3

Success of replication of the embossed structure

| Master film used | Success of replication (%) |
| --- | --- |
| E1F1 | 100 |
| E2F1 | 100 |
| E3F1 | 100 |
| E5F1 | 100 |
| E6F1 | 100 |
| V1F1 | 52* |
| V2F1 | 100 |
| V3F1 | 17 |
| V4F1 | <1 |
| V5F1 | 86 |

*= Average value of two determinations

The data show that, in the case where V3F1 and V4F1 are used, replication is only inadequate. When using V1F1 and V5F1, as well, values of only <100% are obtained when assessing the success of replication, since in these cases parts of the coating B2 could not be removed from the coatings V1 and V5 of the respective master films. Conversely, when using the investigated master films E1F1 to E3F1 and E5F1 and E6F1, a replication success of 100% is achieved.

2.8 Production of Further Transfer Films:

A thermally curable coating composition (B2a) is applied with a wet layer thickness of 200 µm to the structured surface of the respective master film E1F1, which carries one of the microstructures A or B. The at least partial curing of the thus obtained stack of master film and coating composition (B2a) takes place after a flash-off time of 10 minutes at room temperature (23° C.) in a commercial oven from Heraeus at 80° C. oven temperature (45 min). It is thus obtained as a stack a composite (B2B1F1) as a transfer film.

The used thermally curable coating composition (B2a) is a commercially available thermosetting 2K coating composition. The mixing ratio between component 1 and component 2 is 2:1. Component 1 contains at least one polyol and commercial additives. Component 2 contains at least one polyisocyanate and commercially available additives.

From the transfer films thus obtained, composites (F2KB2) are obtained by means of the procedure described under point 2.6.

Table 4 below summarizes the results of the tests of the success of replication performed on the obtained transfer films taking into account each master film used for embossing.

TABLE 4

Success of replication of the embossed structure

| Master film used | Success of replication (%) |
| --- | --- |
| E1F1 (with microstructure A) | 100 |
| E1F1 (with microstructure B) | 100 |

The data show that in the case of the use of the investigated master films E1F1 a replication success of 100% is achieved, even if a thermosetting coating composition is used as the coating composition (B2a).

What is claimed is:

1. A method for transferring an embossed structure to at least a part of a surface of a coating (B2), using a composite (F1B1) composed of a substrate (F1) and of an at least partially embossed and at least partially cured coating (B1), where the coating (B2) and the coating (B1) of the composite (F1B1) have embossed structures which are mirror images of one another, the method comprising:
   (1) applying a coating composition (B2a) to at least a part of an at least partially embossed surface of a composite (B1F1) comprising the substrate (F1), and the at least partially embossed and at least partially cured coating (B1), to give a composite (B2aB1F1), and
   (2) (2) at least partially curing the applied coating composition (B2a) to give a composite (B2B1F1) comprising the substrate (F1), the at least partially embossed and at least partially cured coating (B1), and the at least partially cured coating (B2), and
   (3) removing the coating (B2) from the composite (B2B1F1) to restore the composite (B1F1) used in step (1), where the coating (B2), on its surface previously facing the coating (B1) within the composite (B2B1F1), has a negative image of the at least partially embossed surface of the coating (B1) of the composite (B1F1) used in step (1) and restored in that step,
wherein:
the coating (B2) in step (3) is obtained as a free film by peeling from the composite (B2B1F1) with additional restoration of the composite (B1F1), or
the coating (B2) is obtained in step (3) in three stages in a form of a composite (B2KF2), the method further comprising:
   (3a) applying an adhesive (K) to at least a part of a surface of the composite (B2B1F1), on its side having the coating (B2), to give a composite (KB2B1F1),
   (3b) applying a substrate (F2) to the composite (KB2B1F1) obtained after stage (3a), to at least a part of its surface having the adhesive (K), or vice-versa, to give a composite (F2KB2B1F1), and
   (3c) peeling the composite (B1F1) from the composite (F2KB2B1F1) to give a composite (F2KB2), where the coating (B2) of this composite has on its surface at least partially the negative image of the at least partially embossed surface of the coating (B1) of the composite (B1F1),
where the coating composition (B1a) used for producing the coating (B1) of the composite (B1F1) used in step (1) and restored in step (3) is a radiation-curable coating composition,
wherein the radiation-curable coating composition (B1a) comprises
at least one component (a) in an amount in a range from 40 to 95 wt %,
at least one additive as component (b) in an amount in a range from 0.01 to 5 wt %,
at least one photoinitiator as component (c) in an amount in a range from 0.01 to 15 wt %, and
at least one component (d), comprising at least one carbon double bond, in an amount in a range from 0 to 45 wt %,
where (i) the components (a), (b), (c), and (d) are each different from one another, (ii) the stated amounts of the components (a), (b), (c), and (d) are each based on a total weight of the coating composition (B1a), and (iii) the amounts of all components present in the coating composition (B1a) add up to 100 wt %,
and where component (a) comprises at least three structural units, each different from one another or at least partially identical, of formula (I)

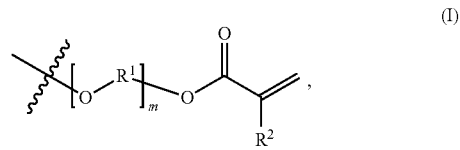

in which
radicals $R^1$ in each case independently of one another are a $C_2$-$C_8$ alkylene group, radicals $R^2$ in each case independently of one another are H or methyl, and
m each independently of one another are an integral parameter in a range from 1 to 15, but with proviso that m is at least 2 in at least one of the structural units of the formula (I) within the component (a).

2. The method as claimed in claim 1, wherein the coating (B2) is obtained as a free film by peeling from the composite (F2KB2) obtained after stage (3c).

3. The method as claimed in claim 1, wherein the at least partially embossed and at least partially cured coating (B1) of the composite (F1B1) used in step (1) has embossments in a micrometer and/or nanometer range.

4. The method as claimed in claim 1, wherein the composite (B1F1) used in step (1) is a composite composed of a film web (F1) and of a coating (B1) which is applied thereto and is at least partially embossed and at least partially cured.

5. The method as claimed in claim 1, wherein the composite (B1F1) used in step (1) and restored after step (3) is reusable and can be used repeatedly for transferring at least one embossed structure.

6. The method as claimed in claim 1, wherein the composite (F1B1) which is used in step (1) and which is composed of the substrate (F1) and of an at least partially embossed and at least partially cured coating (B1) is at least obtainable by
   (4) applying the radiation-curable coating composition (B1a) to at least a part of a surface of the substrate (F1),
   (5) at least partially embossing the radiation-curable coating composition (B1a), applied at least partially to the surface of the substrate (F1), by means of at least one embossing tool (P1) having at least one embossing die (p1),
   (6) at least partially curing the radiation-curable coating composition (B1a), applied to at least a part of the surface of the substrate (F1) and at least partially embossed, by radiation curing, to give a composite (F1B1) composed of substrate (F1) and of at least partially embossed and at least partially cured coating (B1), where throughout a duration of the at least partial curing the coating composition (B1a) is in contact with the at least one embossing die (p1) of the at least one embossing tool (P1), and
   (7) removing the composite (F1B1) from the embossing tool (P1).

7. The method as claimed in claim 1, wherein a solids content of the coating composition (B1a) is >90 wt %, based on a total weight of the coating composition (B1a).

8. The method as claimed in claim 1, wherein m is at least 2 in each of the at least three structural units of the formula (I) of component (a).

9. The method as claimed in claim 1, wherein a fraction of ether segments —[O—R$^1$]$_m$— present in the structural units of formula (I) in the component (a) is at least 35 wt %, based on a total weight of component (a).

10. A method for producing a coating (B2), embossed at least partially on one of its surfaces, in the form of a free film, using a composite (B2B1F1) comprising:
 a substrate (F1),
 an at least partially embossed and at least partially cured coating (B1), and
 an at least partially cured coating (B2) applied to (B1),
 where the coating (B1) is producible by at least partially curing a coating composition (B1a), applied to at least a part of a surface of the substrate (F1) and at least partially embossed, by radiation curing, where the coating composition (B1a) is a radiation-curable coating composition,
 wherein the coating composition (B1a) comprises:
  at least one component (a) in an amount in a range from 40 to 95 wt %,
  at least one additive as component (b) in an amount in a range from 0.01 to 5 wt %,
  at least one photoinitiator as component (c) in an amount in a range from 0.01 to 15 wt %, and
  at least one component (d), comprising at least one carbon double bond, in an amount in a range from 0 to 45 wt %,
  where (i) the components (a), (b), (c), and (d) are each different from one another, (ii) the stated amounts of the components (a), (b), (c) and (d) are each based on a total weight of the coating composition (B1a), and (iii) the amounts of all components present in the coating composition (B1a) add up to 100 wt %,
 and where component (a) comprises at least three structural units, each different from one another or at least partially identical, of formula (I)

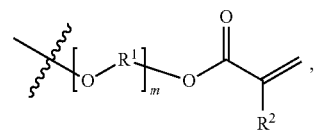

wherein radicals R$^1$ in each case independently of one another are a C$_2$-C$_8$ alkylene group, radicals R$^2$ in each case independently of one another are H or methyl, and m each independently of one another are an integral parameter in a range from 1 to 15, but with proviso that m is at least 2 in at least one of the structural units of the formula (I) within the component (a).

11. A method for producing a composite (B2KF2) comprising a substrate (F2), at least one adhesive (K), and the coating (B2), using a composite (B2B1F1) comprising:
 a substrate (F1),
 an at least partially embossed and at least partially cured coating (B1), and
 an at least partially cured coating (B2) applied to (B1),
 where the coating (B1) is producible by at least partially curing a coating composition (B1a), applied to at least a part of a surface of the substrate (F1) and at least partially embossed, by radiation curing, where the coating composition (B1a) is a radiation-curable coating composition,
 wherein the coating composition (B1a) comprises:
  at least one component (a) in an amount in a range from 40 to 95 wt %,
  at least one additive as component (b) in an amount in a range from 0.01 to 5 wt %,
  at least one photoinitiator as component (c) in an amount in a range from 0.01 to 15 wt %, and
  at least one component (d), comprising at least one carbon double bond, in an amount in a range from 0 to 45 wt %,
  where (i) the components (a), (b), (c), and (d) are each different from one another, (ii) the stated amounts of the components (a), (b), (c) and (d) are each based on a total weight of the coating composition (B1a), and (iii) the amounts of all components present in the coating composition (B1a) add up to 100 wt %,
 and where component (a) comprises at least three structural units, each different from one another or at least partially identical, of formula (I)

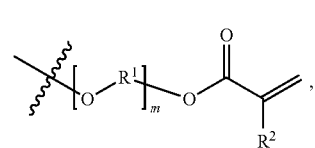

wherein radicals R$^1$ in each case independently of one another are a C$_2$-C$_8$ alkylene group, radicals R$^2$ in each case independently of one another are H or methyl, and m each independently of one another are an integral parameter in a range from 1 to 15, but with proviso that m is at least 2 in at least one of the structural units of the formula (I) within the component (a).

* * * * *